(12) United States Patent
Lee et al.

(10) Patent No.: US 11,832,030 B2
(45) Date of Patent: Nov. 28, 2023

(54) ELECTRONIC APPARATUS INCLUDING PROJECTOR

(71) Applicant: SAMSUNG ELECTRONICS CO., LTD., Suwon-si (KR)

(72) Inventors: Jinhak Lee, Suwon-si (KR); Kihwan Kim, Suwon-si (KR); Younjung Kim, Suwon-si (KR); Junyoung Kim, Suwon-si (KR); Sanghee Park, Suwon-si (KR); Yunson Yoo, Suwon-si (KR); Minyoung Lee, Suwon-si (KR); Ilkwang Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/432,728

(22) PCT Filed: Oct. 24, 2019

(86) PCT No.: PCT/KR2019/014100
§ 371 (c)(1),
(2) Date: Aug. 20, 2021

(87) PCT Pub. No.: WO2020/171339
PCT Pub. Date: Aug. 27, 2020

(65) Prior Publication Data
US 2022/0094889 A1 Mar. 24, 2022

(30) Foreign Application Priority Data
Feb. 22, 2019 (KR) ........................ 10-2019-0021419

(51) Int. Cl.
*H04N 9/31* (2006.01)
*G06V 20/52* (2022.01)
*H04N 23/57* (2023.01)

(52) U.S. Cl.
CPC ............. *H04N 9/317* (2013.01); *G06V 20/52* (2022.01); *H04N 9/3144* (2013.01); *H04N 23/57* (2023.01)

(58) Field of Classification Search
CPC ...... H04N 23/57; H04N 9/3194; H04N 9/317; H04N 9/3144; H04N 9/3141; G06V 20/52; G06V 20/00
See application file for complete search history.

(56) References Cited

U.S. PATENT DOCUMENTS 6,652,104 B2 * 11/2003 Nishida ................ H04N 9/3194
353/69
6,877,863 B2 * 4/2005 Wood ................... H04N 9/3185
353/42
(Continued)

FOREIGN PATENT DOCUMENTS

JP 2015-179245 10/2015
JP 2018-205494 12/2018
(Continued)

OTHER PUBLICATIONS

International Search Report for PCT/KR2019/014100 dated Feb. 5, 2020, 5 pages.
(Continued)

*Primary Examiner* — Michael B. Pierorazio
(74) *Attorney, Agent, or Firm* — Nixon & Vanderhye, P.C.

(57) ABSTRACT

An electronic apparatus according to various embodiments disclosed in the disclosure may comprise: a first housing rotatable about a first axis; a projector module coupled to a portion of the first housing and rotatable about a second axis perpendicular to the first axis; a vision sensor module rotatable about the first axis; a second housing; a first driving device disposed inside the first housing and capable of transmitting power to each of the projector module and the (Continued)

first housing; and a second driving device disposed inside the second housing and capable of transmitting power to the vision sensor module. According to the various embodiments, the projector module can rotate independently of the first housing in the direction of the second axis, and the vision sensor module can rotate independently of the first housing in the direction of the first axis.

15 Claims, 28 Drawing Sheets

(56) References Cited

U.S. PATENT DOCUMENTS

| | | | | |
|---|---|---|---|---|
| 7,070,283 | B2* | 7/2006 | Akutsu | H04N 9/3194 353/30 |
| 7,182,466 | B2* | 2/2007 | Sunaga | H04N 5/74 353/69 |
| 7,270,421 | B2* | 9/2007 | Shinozaki | G03B 21/142 353/121 |
| 7,359,575 | B2* | 4/2008 | Bassi | G06T 3/0093 345/427 |
| 7,441,906 | B1* | 10/2008 | Wang | G03B 21/14 353/121 |
| 7,782,387 | B2* | 8/2010 | Azuma | H04N 23/635 359/662 |
| 8,194,168 | B2 | 6/2012 | Mowry | |
| 9,225,950 | B2 | 12/2015 | Lee et al. | |
| 9,798,153 | B2 | 10/2017 | Ide | |
| 2002/0051095 | A1* | 5/2002 | Su | H04N 9/3194 348/745 |
| 2002/0122161 | A1* | 9/2002 | Nishida | H04N 9/3194 353/70 |
| 2003/0191836 | A1* | 10/2003 | Murtha | H04L 67/02 709/224 |
| 2003/0210381 | A1* | 11/2003 | Itaki | H04N 5/74 353/70 |
| 2004/0156024 | A1* | 8/2004 | Matsuda | H04N 9/3185 353/70 |
| 2005/0046803 | A1* | 3/2005 | Akutsu | H04N 9/3194 353/69 |
| 2005/0073661 | A1* | 4/2005 | Tamura | H04N 9/3194 353/70 |
| 2005/0151934 | A1* | 7/2005 | Akutsu | G03B 21/147 353/69 |
| 2005/0237492 | A1* | 10/2005 | Shinozaki | H04N 9/3185 353/69 |
| 2006/0098167 | A1* | 5/2006 | Sato | G03B 21/26 353/35 |
| 2006/0187420 | A1* | 8/2006 | Wei | G03B 21/16 353/61 |
| 2006/0203207 | A1* | 9/2006 | Ikeda | H04N 9/3185 353/70 |
| 2007/0008344 | A1* | 1/2007 | Medina | H04N 9/3185 345/647 |
| 2007/0257941 | A1* | 11/2007 | Plut | G06F 9/451 345/660 |
| 2007/0285626 | A1* | 12/2007 | Miyasaka | G03B 21/206 353/85 |
| 2009/0278999 | A1* | 11/2009 | Ofune | H04N 21/47 348/E3.048 |
| 2010/0002123 | A1* | 1/2010 | Nozaki | H04N 23/00 348/E5.022 |
| 2010/0045942 | A1* | 2/2010 | Furui | H04N 9/3194 353/69 |
| 2011/0085044 | A1* | 4/2011 | Noda | G03B 21/58 348/E5.133 |
| 2011/0210979 | A1* | 9/2011 | Furui | H04N 9/3147 345/619 |
| 2011/0234994 | A1* | 9/2011 | Uchiyama | H04N 9/3185 353/121 |
| 2011/0285971 | A1* | 11/2011 | Oka | H04N 9/3185 353/70 |
| 2011/0292351 | A1* | 12/2011 | Ishii | H04N 9/3185 353/69 |
| 2016/0062219 | A1 | 3/2016 | Mikawa et al. | |
| 2017/0299952 | A1* | 10/2017 | Jorgensen | G03B 21/145 |
| 2018/0158102 | A1* | 6/2018 | Choi | G06Q 30/0251 |
| 2021/0289178 | A1* | 9/2021 | Ogishita | H04N 9/3194 |

FOREIGN PATENT DOCUMENTS

| | | |
|---|---|---|
| KR | 10-1075047 | 10/2011 |
| KR | 10-2013-0072748 | 7/2013 |
| KR | 10-2014-0123335 | 10/2014 |
| KR | 10-2018-0125683 | 11/2018 |

OTHER PUBLICATIONS

Written Opinion of the ISA for PCT/KR2019/014100 dated Feb. 5, 2020, 5 pages.

* cited by examiner

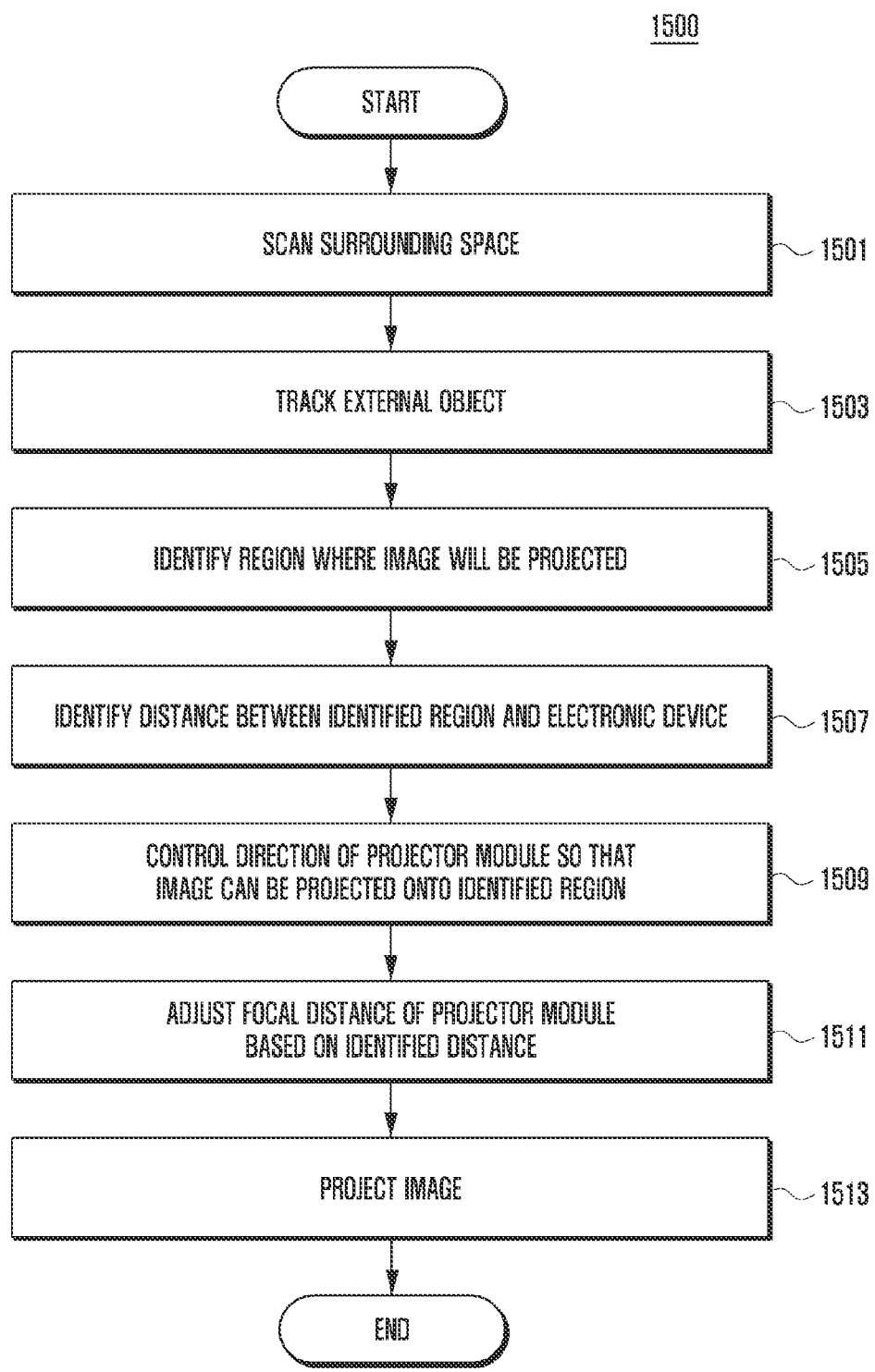

ELECTRONIC APPARATUS INCLUDING PROJECTOR

CROSS-REFERENCE TO RELATED APPLICATIONS

This application is a national stage of International Application No. PCT/KR2019/014100 designating the United States, filed on Oct. 24, 2019, in the Korean Intellectual Property Receiving Office and claiming priority to Korean Patent Application No. 10-2019-0021419, filed on Feb. 22, 2019, in the Korean Intellectual Property Office, the disclosures of which are incorporated by reference herein in their entireties.

BACKGROUND

Field

The disclosure relates to an electronic apparatus including a projector

Description of Related Art

With the development of technology, electronic apparatus capable of performing various functions are being developed. An electronic apparatus capable of performing a projection function may project an image onto a predetermined region based on a current location of the electronic apparatus. If an electronic apparatus includes a sensor capable of recognizing a space, the electronic apparatus may identify a region where an image will be projected by recognizing a space.

In an electronic apparatus including a projector, if the direction of the projector is fixed, a region where an image can be projected may be limited.

In an electronic apparatus including a sensor capable of recognizing a space and a object and a projector, if the sensor and the projector can be driven only in the same direction, the sensor and the projector may not independently perform a space and object recognition function and a projection function.

If the projector projects an image using one lens, a phenomenon in which some of a projection region is not focused may occur because one focal distance is applied to the entire projection region in a lump.

SUMMARY

An electronic apparatus according to various example embodiments of the disclosure may include: a first housing rotatable around a first axis, a projector module including a projector coupled to a part of the first housing and rotatable around a second axis perpendicular to the first axis, a vision sensor module including a vision sensor rotatable around the first axis, a second housing, a first driving device including a motor disposed within the first housing and capable of delivering electric power to each of the projector module and the first housing, and a second driving device including a motor disposed within the second housing and capable of delivering electric power to the vision sensor module. According to various embodiments, the projector module may be rotated in the direction of the second axis independently of the first housing, and the vision sensor module may be rotated in the direction of the first axis independently of the first housing.

The electronic apparatus according to various example embodiments of the disclosure can identify various regions in a space as projection regions because the projector module can rotate left and right (pan or yaw rotation) and up and down (tilt or pitch rotation).

The electronic apparatus according to various example embodiments of the disclosure can simultaneously perform image projection and object (e.g., user) recognition because the projector module and the vision sensor module can independently rotate.

The projector module of the electronic apparatus according to various example embodiments of the disclosure can adjust a focal distance so that an image is focused on the entire projection region upon projection of the image because the projector module includes a plurality of micro lenses.

BRIEF DESCRIPTION OF THE DRAWINGS

The above and other aspects, features and advantages of certain embodiments of the present disclosure will be more apparent from the following detailed description, taken in conjunction with the accompanying drawing, in which:

FIG. 15 is a flowchart illustrating an example operation of the electronic apparatus according to various embodiments;

DETAILED DESCRIPTION

Figure 1:
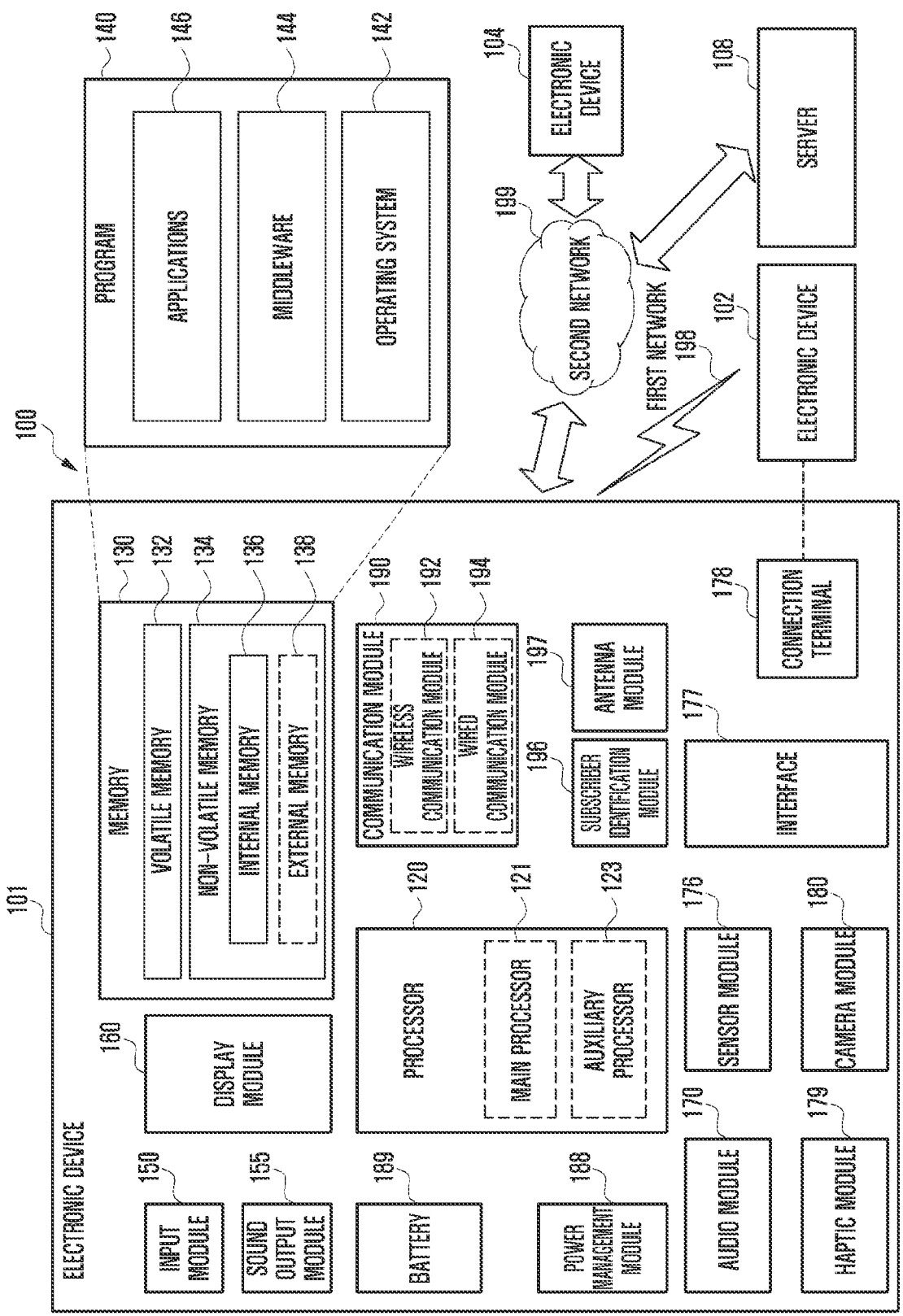
FIG. 1 is a block diagram illustrating an example electronic apparatus within a network environment according to various embodiments.

FIG. 1 is a block diagram illustrating an example electronic apparatus 101 in a network environment 100 according to various embodiments. Referring to FIG. 1, the electronic apparatus 101 in the network environment 100 may communicate with an electronic apparatus 102 via a first network 198 (e.g., a short-range wireless communication network), or an electronic apparatus 104 or a server 108 via a second network 199 (e.g., a long-range wireless communication network). According to an embodiment, the electronic apparatus 101 may communicate with the electronic apparatus 104 via the server 108. According to an embodiment, the electronic apparatus 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic apparatus 101, or one or more other components may be added in the electronic apparatus 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic apparatus 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic apparatus 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic apparatus 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic apparatus 101, from the outside (e.g., a user) of the electronic apparatus 101. The input device 150 may include, for example, a microphone, a mouse, a keyboard, or a digital pen (e.g., a stylus pen).

The sound output device 155 may output sound signals to the outside of the electronic apparatus 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic apparatus 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic apparatus (e.g., an electronic apparatus 102) directly (e.g., wiredly) or wirelessly coupled with the electronic apparatus 101.

The sensor module 176 may detect an operational state (e.g., power or temperature) of the electronic apparatus 101 or an environmental state (e.g., a state of a user) external to the electronic apparatus 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic apparatus 101 to be coupled with the external electronic apparatus (e.g., the electronic apparatus 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic apparatus 101 may be physically connected with the external electronic apparatus (e.g., the electronic apparatus 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic apparatus 101. According to an embodiment, the power management module 188 may be implemented as at least part of, for example, a power management integrated circuit (PMIC).

The battery 189 may supply power to at least one component of the electronic apparatus 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic apparatus 101 and the external electronic apparatus (e.g., the electronic apparatus 102, the electronic apparatus 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic apparatus via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic apparatus 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic apparatus) of the electronic apparatus 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic apparatus via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic apparatus 101 and the external electronic apparatus 104 via the server 108 coupled with the second network 199. Each of the electronic apparatuses 102 and 104 may be a device of a same type as, or a different type, from the electronic apparatus 101. According to an embodiment, all or some of operations to be executed at the electronic apparatus 101 may be executed at one or more of the external electronic apparatuses 102, 104, or 108. For example, if the electronic apparatus 101 should perform a function or a service automatically, or in response to a request from a user or another device, the electronic apparatus 101, instead of, or in addition to, executing the function or the service, may request the one or more external electronic apparatuses to perform at least part of the function or the service. The one or more external electronic apparatuses receiving the request may perform the at least part of the function or the service requested, or an additional function or an additional service related to the request, and transfer an outcome of the performing to the electronic apparatus 101. The electronic apparatus 101 may provide the outcome, with or without further processing of the outcome, as at least part of a reply to the request. To that end, a cloud computing, distributed computing, or client-server computing technology may be used, for example.

Figure 2A:
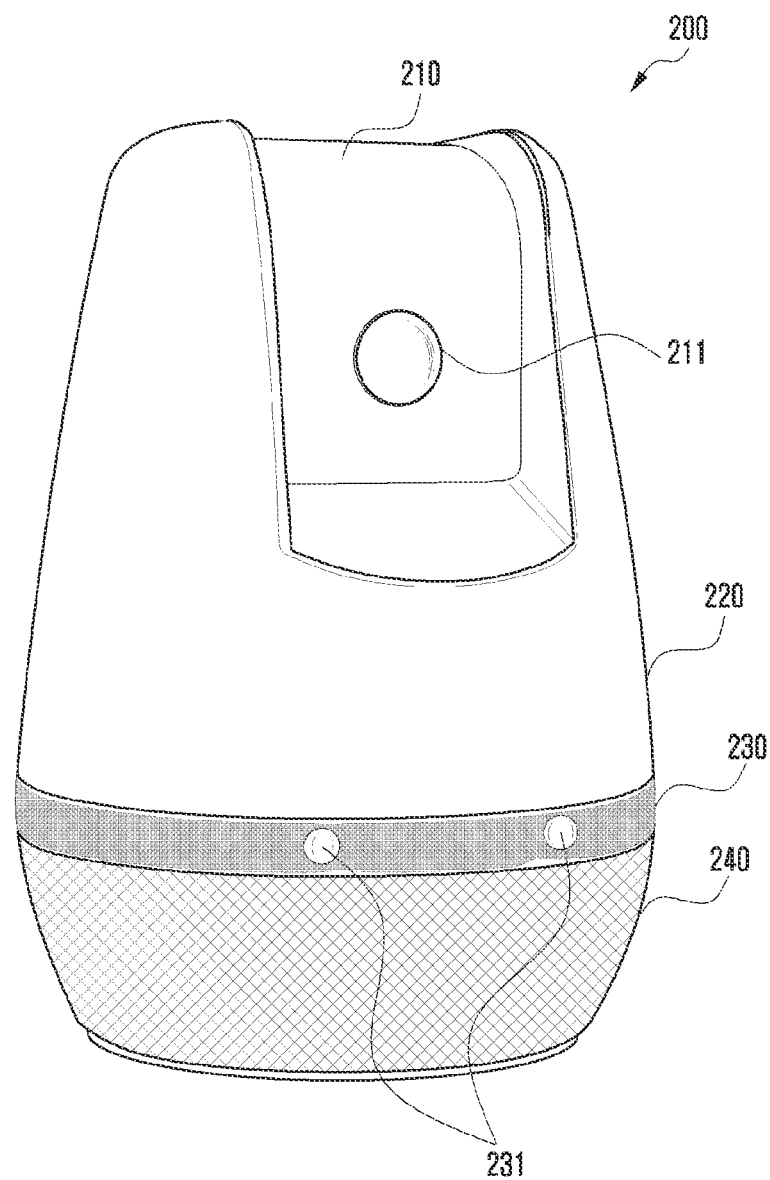
FIGS. 2A and 2B are diagrams illustrating an electronic apparatus according to various embodiments.
Figure 2B:
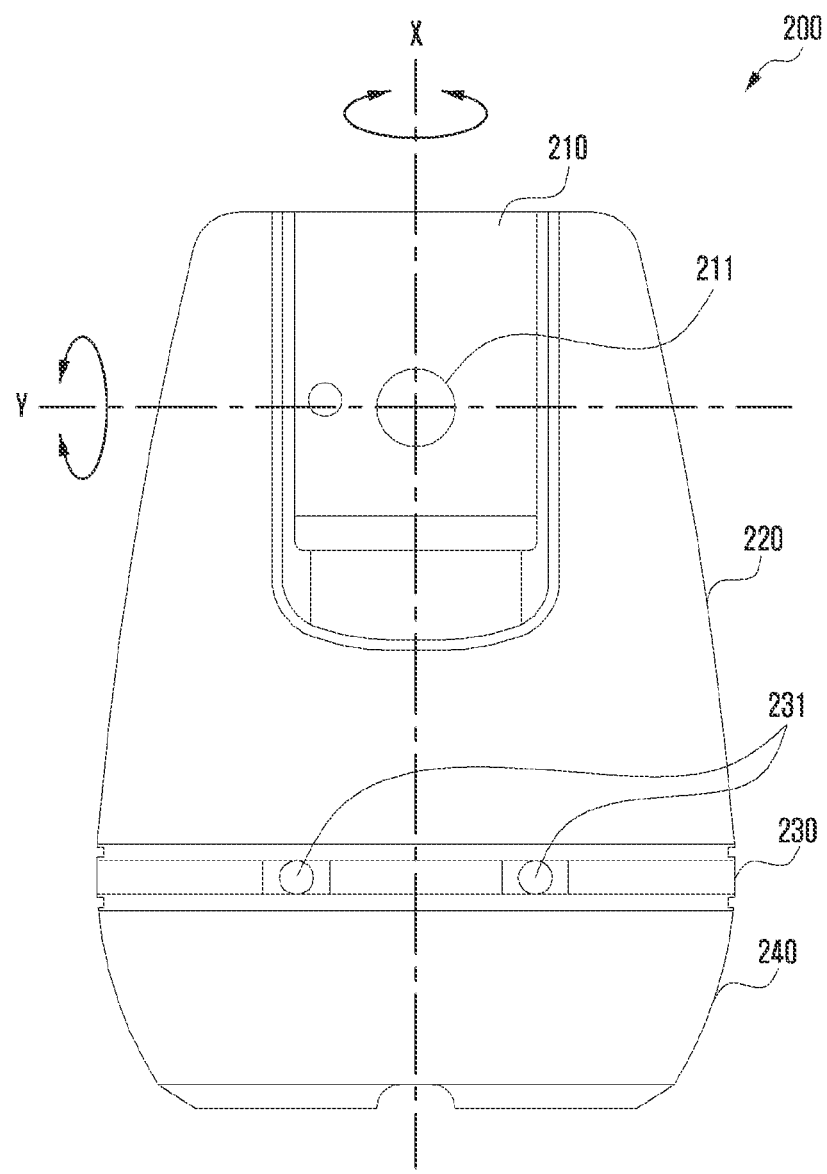

FIGS. 2A and 2B are diagrams illustrating an electronic apparatus according to various embodiments. FIG. 2A is a perspective view of the electronic apparatus according to various embodiments. FIG. 2B is a front view of the electronic apparatus according to various embodiments.

Referring to FIGS. 2A and 2B, an electronic apparatus 200 (e.g., the electronic apparatus 101 in FIG. 1) according to various embodiments may include a projector module 210 (e.g., the display device 160 in FIG. 1), a first housing 220, a vision sensor module 230 (e.g., the sensor module 176 in FIG. 1) and a second housing 240. The projector module 210 may be a device including a projector 211 capable of projecting an image, for example. The vision sensor module 230 may be a device including two or more vision sensors 231. The two or more vision sensors 231 may be spaced apart from each other at a given interval. If the vision sensor module 230 includes the two or more vision sensors 231 spaced apart from each other at a given interval, the vision sensor module 230 may measure a distance between one region of a space and the electronic apparatus 200 using a phase angle.

According to various embodiments, the vision sensor module 230 may be implemented as an event-based vision sensor in order to improve a tracking speed for an external object (e.g., a user). The event-based vision sensor may refer, for example, to a sensor for sensing an event related to a movement of the external object. For example, the event-based vision sensor does not transmit data to a processor when the external object is in a stop state, and may transmit, to the processor, information related to a movement of the external object when the external object moves. The event-based vision sensor may track the external object based on a change in light including pixels corresponding to the external object, which is generated as the external object moves. If the vision sensor module 230 is an event-based vision sensor, the vision sensor module 230 may transmit, to the processor, information related to a movement of the external object only when the external object moves, thereby being capable of improving the tracking speed for the external object. The vision sensor may be a dynamic vision sensor, for example.

According to various embodiments, the projector module 210 may be disposed at the top of the first housing 220, for example, and may be rotatably coupled to the first housing 220.

According to various embodiments, a first driving device capable of driving the projector module 210 and the first housing 220 may be disposed within the first housing 220. The first driving device according to various embodiments may deliver electric power (or output torque) to the first housing 220, for example, so that the first housing 220 may be rotated in the direction of a first axis having the first axis as a center. The direction of the first axis may be an X-axis direction illustrated in FIG. 2B, for example. The first axis may refer, for example, to an axis fixed to the electronic apparatus 200 and perpendicular to the bottom of the second housing 240 or perpendicular to the ground, for example. The first axis may be an axis that penetrates the electronic apparatus 200 and that is fixed within the electronic apparatus 200, for example. According to various embodiments, when the first housing 220 rotates in the direction of the first axis, the projector module 210 coupled to a part of the first housing 220 may also rotate in the direction of the first axis in subordination to the rotation of the first housing 220.

The first driving device (not illustrated) according to various embodiments may be coupled to the projector module 210, for example, and may deliver electric power to the projector module 210, so that the projector module 210 may rotate in the direction of a second axis having the second axis perpendicular to the first axis as a center. The direction of the second axis may be a y-axis direction illustrated in FIG. 2B, for example. The second axis may be an axis that penetrates the electronic apparatus 200 and that is fixed within the electronic apparatus 200, for example.

According to various embodiments, when the projector module 210 rotates in the direction of the second axis, the projector module 210 may rotate independently of the first housing 220.

According to various embodiments, a second driving device (not illustrated) capable of driving the vision sensor module 230 may be disposed within the second housing 240. The second driving device according to various embodiments may be coupled to the vision sensor module 230, for example, and may deliver electric power to the vision sensor module 230, so that the vision sensor module 230 may rotate in the direction of the first axis having the first axis as a center. According to various embodiments, when the vision sensor module 230 rotates in the direction of the first axis, the vision sensor module 230 may rotate independently of the first housing 220. According to various embodiments, the bottom of the second housing 240 may be a flat surface so that the electronic apparatus 200 can be easily held on a plane.

According to various embodiments, a processor (e.g., including processing circuitry), an array microphone, at least one speaker, a driving device control board and/or a motor driver may be disposed within the second housing 240. According to various embodiments, the second housing 240 may include a plurality of speaker holes for an audio output generated from a speaker embedded therein.

In the electronic apparatus 200 according to various embodiments, the second housing 240 may be disposed on the lower side of the electronic apparatus 200, the vision sensor module 230 may be rotatably coupled to at the top of the second housing 240, and the first housing 220 may be rotatably coupled at the top of the vision sensor module 230, thus being capable of forming a stack type structure. The projector module 210 may be rotatably coupled at the top of the first housing 220.

Figure 3:
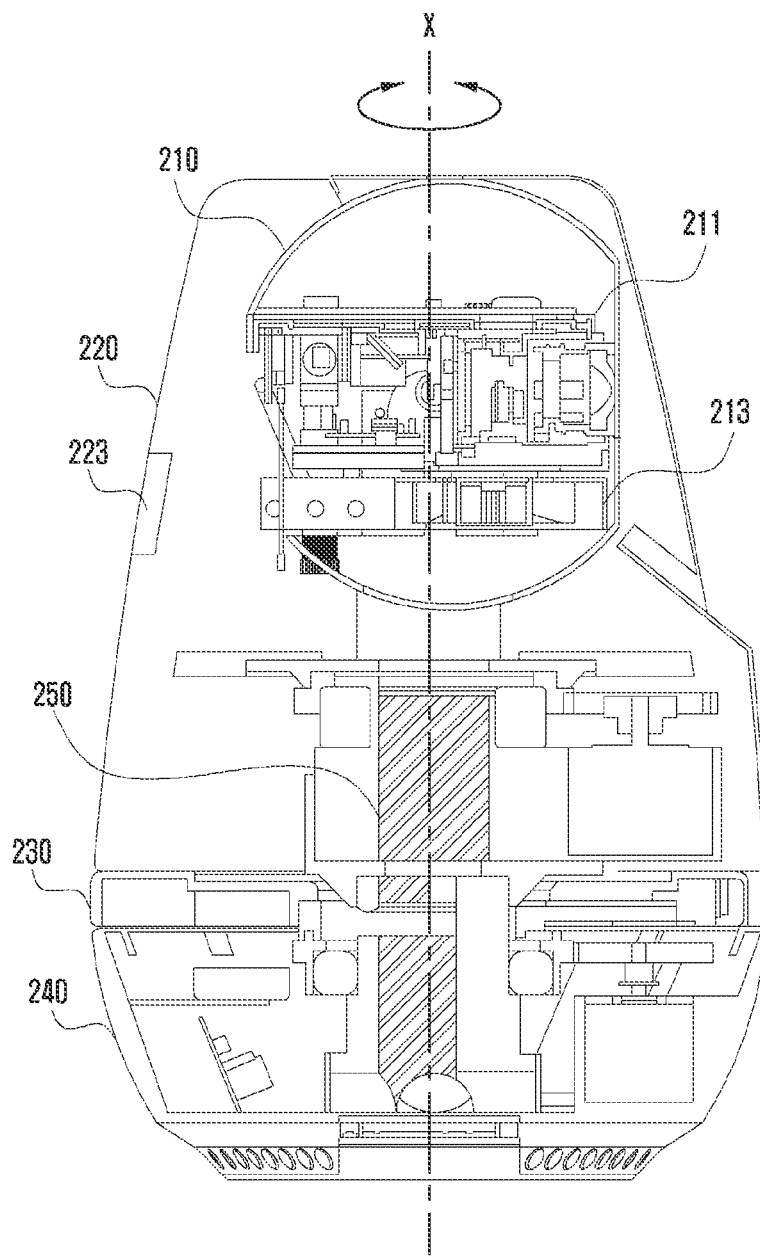
FIG. 3 is a cross-sectional side view of the electronic apparatus according to various embodiments.

FIG. 3 is a cross-sectional side view of the electronic apparatus 200 according to various embodiments.

Referring to FIG. 3, the electronic apparatus 200 according to various embodiments may include a cylindrical pillar 250 disposed within the electronic apparatus 200 and penetrating the vision sensor module 230. The cylindrical pillar 250 may be a pillar 250 having the first axis as a center axis. According to various embodiments, the vision sensor module 230 may be coupled to the pillar 250 to be rotatable in the direction of the first axis.

According to various embodiments, the projector module 210 may be electrically connected to various system elements disposed within the second housing 240 through electric wiring within the pillar 250. For example, the projector module 210 may be electrically connected to the processor disposed within the second housing 240 through the electric wiring within the pillar 250.

According to various embodiments, the projector module 210 may be disposed at the top of the first housing 220, for example, and may be coupled to the first housing 220 in a way to be rotatable in the direction of the second axis.

According to various embodiments, the projector module 210 may include the projector 211 and a heat dissipation structure 213 disposed under the projector 211. The heat dissipation structure 213 will be described in greater detail below with reference to FIGS. 16A and 16B.

According to various embodiments, the first driving device capable of driving the projector module 210 and the first housing 220 may be disposed within the first housing 220. The first driving device according to various embodiments may deliver electric power to the first housing 220, for example, so that the first housing 220 may rotate in the direction of the first axis having the first axis as a center. The rotation of the first housing 220 and the projector module 210 by the first driving device will be described in detail later.

According to various embodiments, at least one outlet 223 for draining internal space may be formed in a part of the first housing. For example, air discharged through the heat dissipation structure may be discharged to the outside of the electronic apparatus through the at least one outlet.

According to various embodiments, the second driving device capable of driving the vision sensor module 230 may be disposed within the second housing 240. The second driving device according to various embodiments may be coupled to the vision sensor module 230, for example, and may deliver electric power to the vision sensor module 230, so that the vision sensor module 230 may rotate in the direction of the first axis having the first axis as a center. The rotation of the vision sensor module 230 by the second driving device will be described in greater detail below.

Figure 4A:
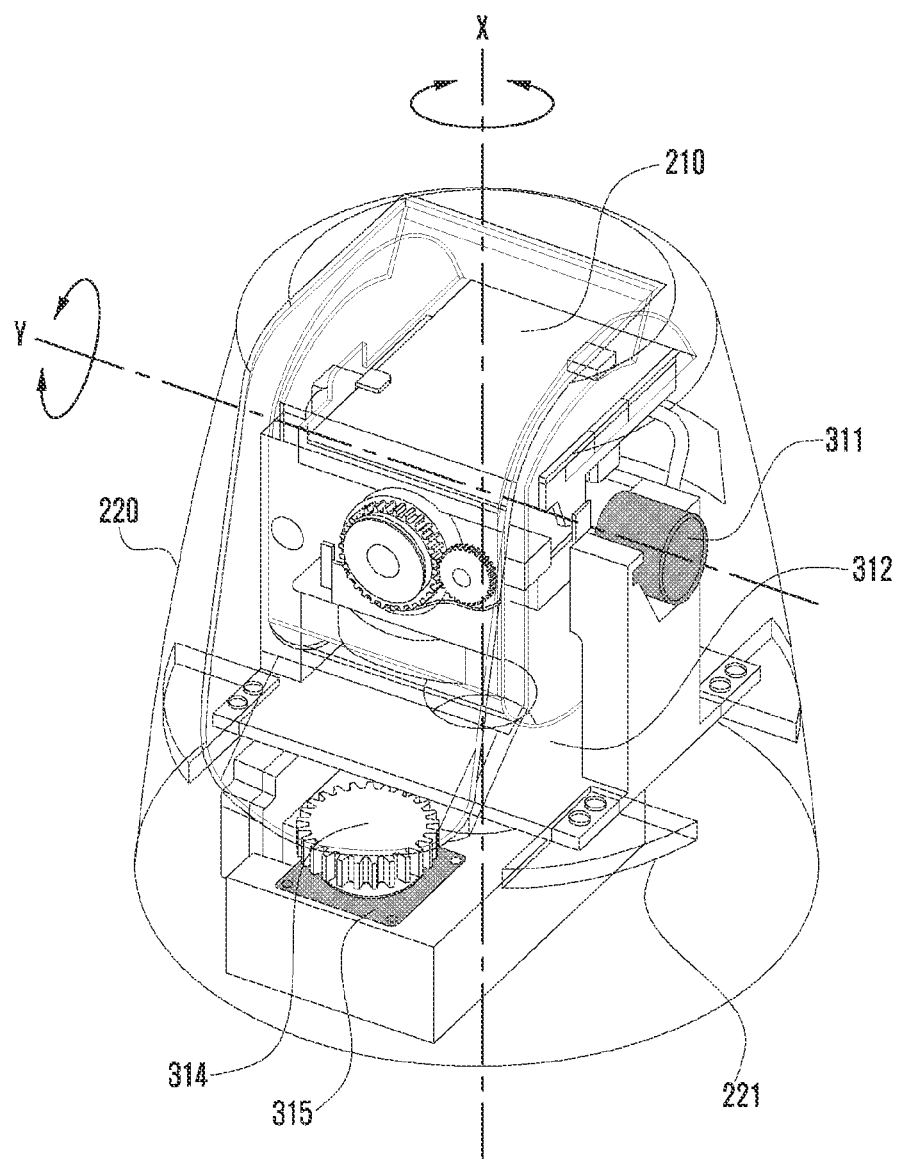
FIGS. 4A and 4B are diagrams illustrating a first housing, a projector module and a first driving device according to various embodiments.
Figure 4B:
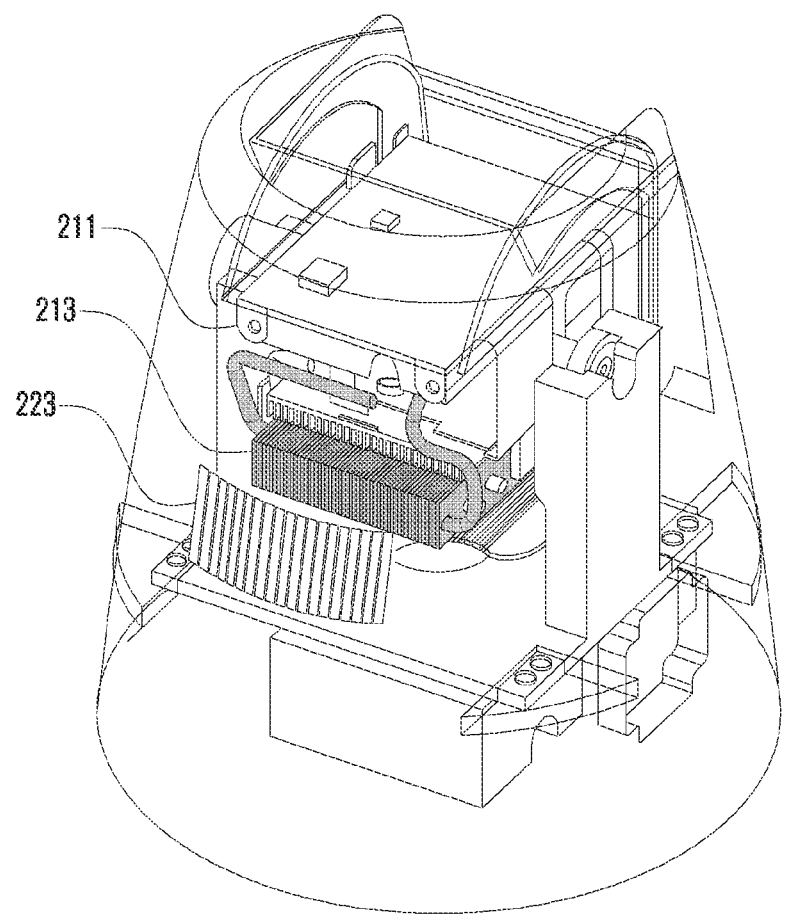

FIGS. 4A and 4B are diagrams illustrating the first housing 220, the projector module 210 and the first driving device according to various embodiments.

Referring to FIGS. 4A and 4B, the first driving device (e.g., a two-axis actuator) according to various embodiments may be disposed within the first housing 220 and coupled to the projector module 210 and the first housing 220, and may deliver electric power to each of the projector module 210 and the first housing 220.

The first driving device according to various embodiments may include a first motor 311 coupled to the projector module 210 and having a rotation axis identical with the second axis, a first rotation member 312 coming into contact with at least some of an internal surface of the first housing 220, a first gear (not illustrated) (refer to a first gear 313 in FIG. 7A) disposed to rotate in the direction of the first axis (X axis) along with the first rotation member 312, and a second motor 315 including a first pinion gear 314 geared with the first gear. The first rotation member 312 may come into contact with the internal surface of the first housing 220 in various ways. For example, the first rotation member 312 may be fixed to and come into contact with a protrusion 221 within the first housing 220 to be fixed and coupled to the protrusion 221.

Figure 9A:
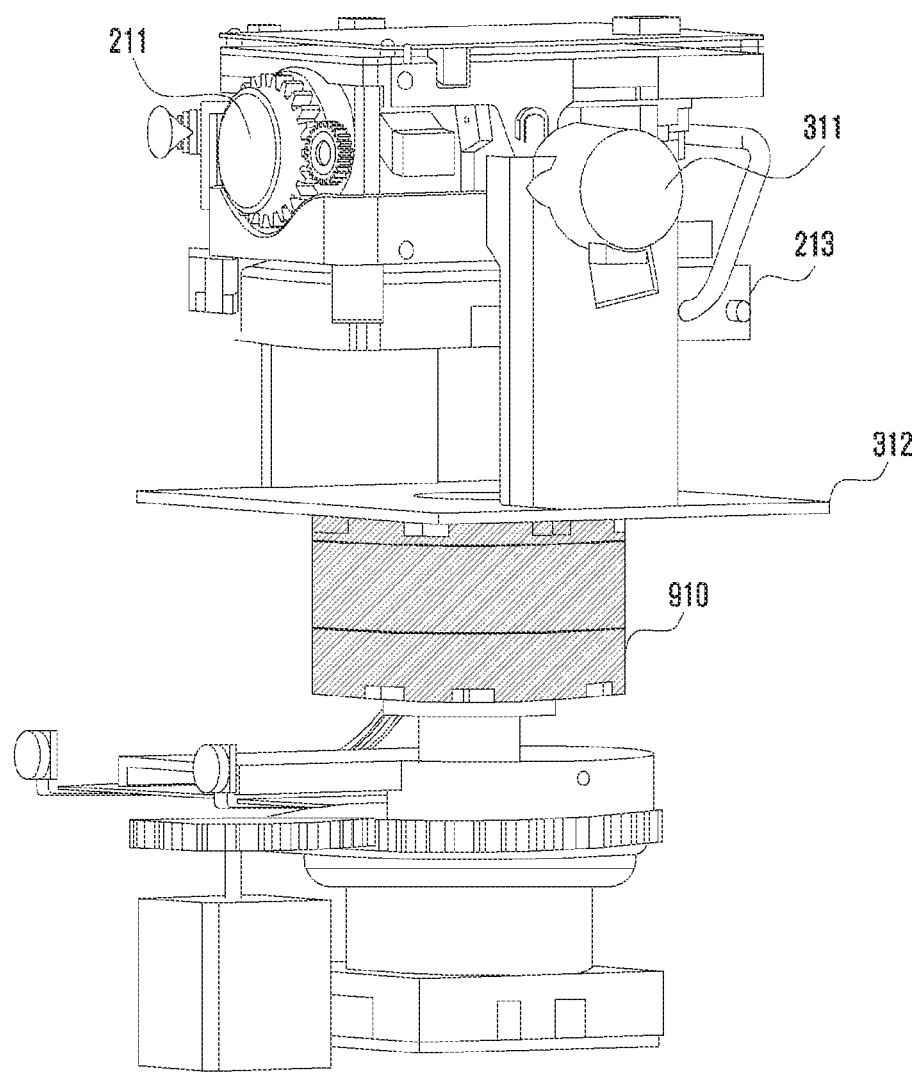
FIGS. 9A and 9B are diagrams illustrating an internal structure of the electronic apparatus according to various embodiments.

According to various embodiments, in the first driving device, the second motor 315 including the first gear (refer to the first gear 313 in FIG. 7A) and the first pinion gear 314 geared with the first gear may be fabricated as one motor (e.g., a third motor in FIG. 9A). A form in which the second motor 315 including the first gear 313 and the first pinion gear 314 is fabricated as one motor will be described in greater detail below with reference to FIGS. 9A and 9B.

According to various embodiments, in order for the projector module 210 to rotate in the direction of the second axis (Y axis), the projector module 210 may rotate in the direction of the second axis by electric power (or rotation torque) supplied by the driving of the first motor 311. According to various embodiments, the rotation of the projector module 210 in the direction of the second axis may be rotation independent of the first housing 220. For example, when the projector module 210 rotates in the direction of the second axis, the first housing 220 may not be influenced by the rotation of the projector module 210 in the direction of the second axis.

According to various embodiments, in order to rotate the first housing 220 in the direction of the first axis, the first housing 220 brought into contact with the first rotation member 312 may be rotated in the direction of the first axis by rotating the first pinion gear 314 in response to the driving of the second motor 315, rotating the first gear geared with the first pinion gear 314, and rotating the first rotation member 312 in response to the rotation of the first gear. According to various embodiments, the projector module 210 may also rotate in subordination to the rotation of the first housing 220 in the direction of the first axis. For example, when the first housing 220 rotates in the direction of the first axis, the projector module 210 coupled to a part of the first housing 220 may also rotate in the direction of the first axis. As a result, the first driving device may rotate the projector module 210 in the direction of the first axis by rotating the first housing 220 in the direction of the first axis by the second motor 315.

According to various embodiments, the heat dissipation structure 213 may be disposed under the projector 211. The heat dissipation structure 213 is a structure for absorbing heat generated from the projector 211 and discharging the absorbed heat to the outside of electronic apparatus 200, for example, and may include at least one heat pipe, a heat sink and a fan structure. According to various embodiments, the heat dissipation structure may forcedly transfer heat absorbed from the projector by supplying an air blast toward the outlet 223 formed in the first housing 220.

Figure 5:
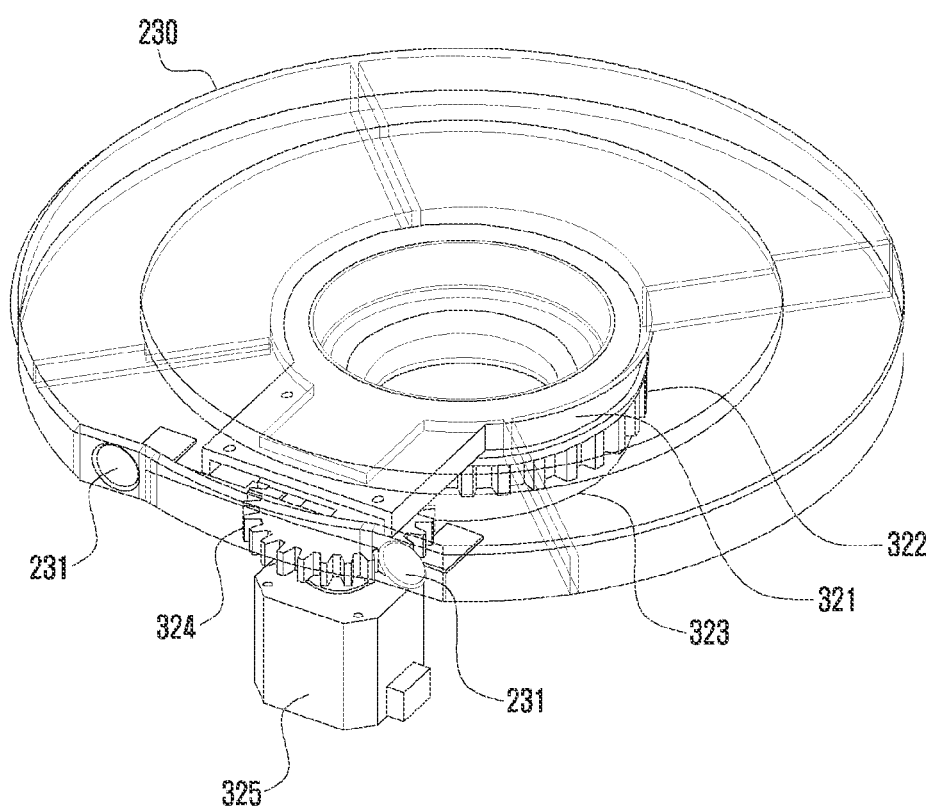
FIG. 5 is a diagram illustrating a vision sensor module and a second driving device according to various embodiments.

FIG. 5 is a diagram illustrating the vision sensor module 230 and the second driving device according to various embodiments.

Referring to FIG. 5, the vision sensor module 230 according to various embodiments may be coupled to the second driving device (e.g., a one-axis actuator).

According to various embodiments, the vision sensor module 230 may include the two or more vision sensors 231 and a vision sensor control board (not illustrated). The vision sensor module 230 may have a shape having a center thereof perforated in a way to be coupled to the cylindrical pillar, for example.

According to various embodiments, the second driving device may include a second rotation member 321, a second gear 322, a second bearing 323, and a fourth motor 325 including a second pinion gear 324. The second rotation member 321 may be a rotation member disposed within the vision sensor module 230 in a way to be rotatable in the direction of the first axis (e.g., the X axis in FIG. 2B), for example. The second gear 322 may be a gear disposed to rotate in the direction of the first axis along with the second rotation member 321, for example. The second pinion gear 324 of the fourth motor 325 may be a pinion gear geared with the second gear 322.

According to various embodiments, in order to rotate the vision sensor module 230 in the direction of the first axis, the vision sensor module 230 may be rotated in the direction of the first axis by rotating the second pinion gear 324 by the driving of the fourth motor 325, rotating the second gear 322 geared with the second pinion gear 324, and rotating the second rotation member 321 in response to the rotation of the second gear 322.

According to various embodiments, the second driving device may be disposed within the second housing 240, and may drive the vision sensor module 230.

Figure 6:
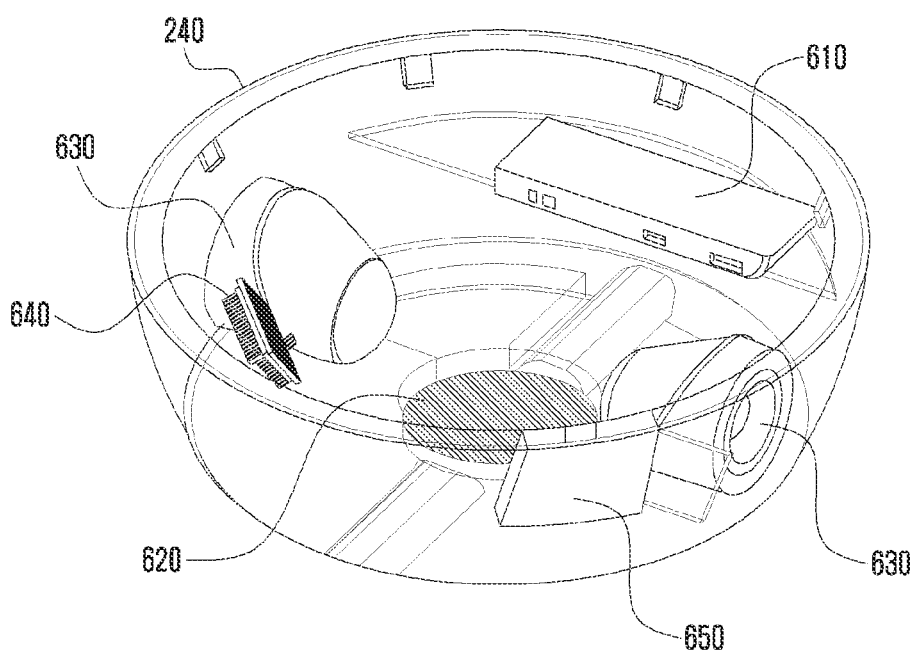
FIG. 6 is a diagram illustrating an inside of a second housing according to various embodiments.

FIG. 6 is a diagram illustrating an inside of the second housing 240 according to various embodiments.

Referring to FIG. 6, according to various embodiments, the second driving device (not illustrated) capable of driving the vision sensor module 230 may be disposed within the second housing 240.

According to various embodiments, a processor (e.g., including processing circuitry) 610, an array microphone 620, at least one speaker 630, a driving device control board 640 and/or a motor driver 650 may be disposed within the second housing 240. According to various embodiments, the second housing 240 may include a plurality of speaker holes for an audio output generated from the speaker 630 embedded therein.

Figure 7A:
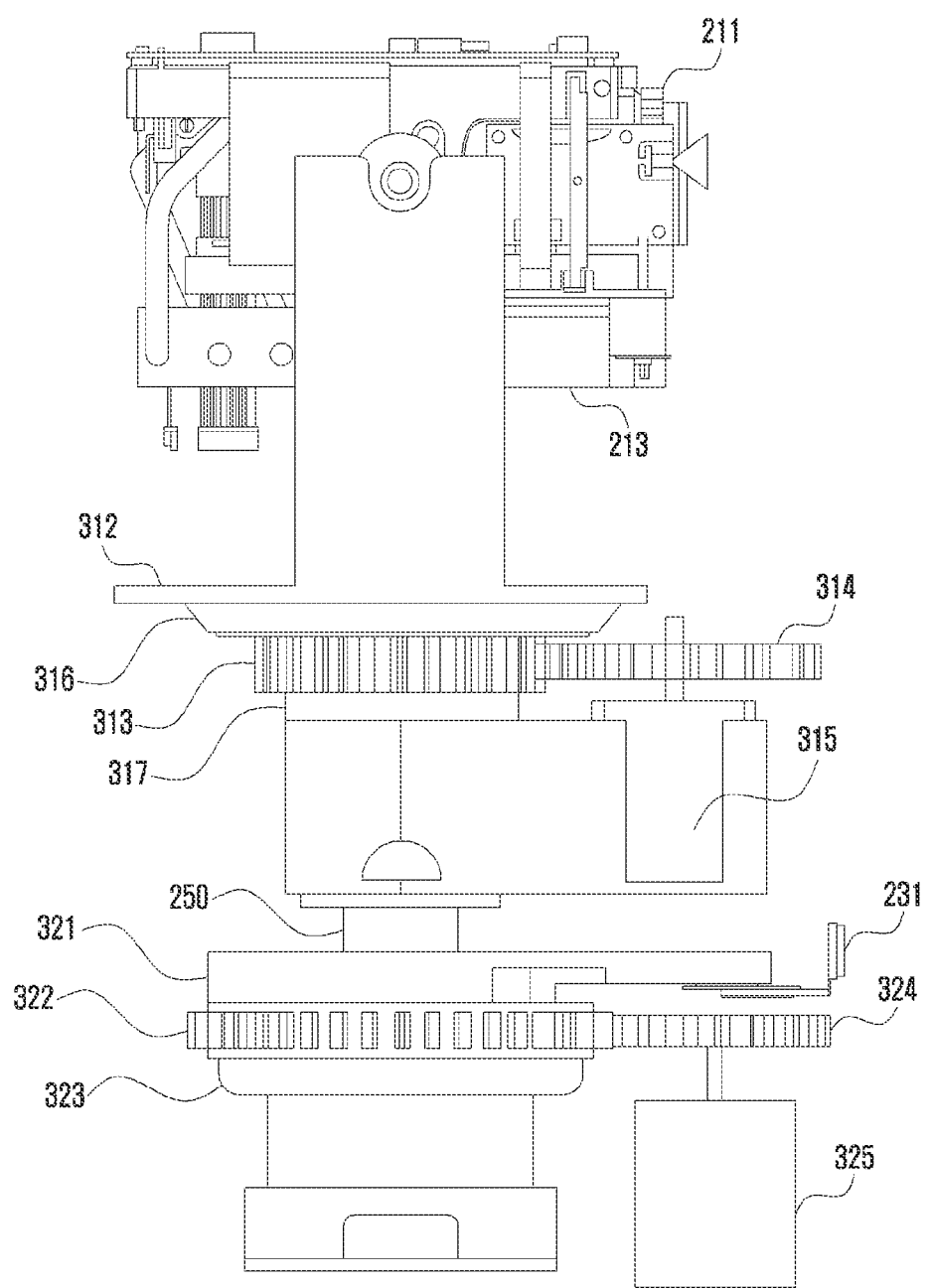
FIGS. 7A and 7B are diagrams illustrating a side view of an internal structure of the electronic apparatus 200 according to various embodiments.
Figure 7B:
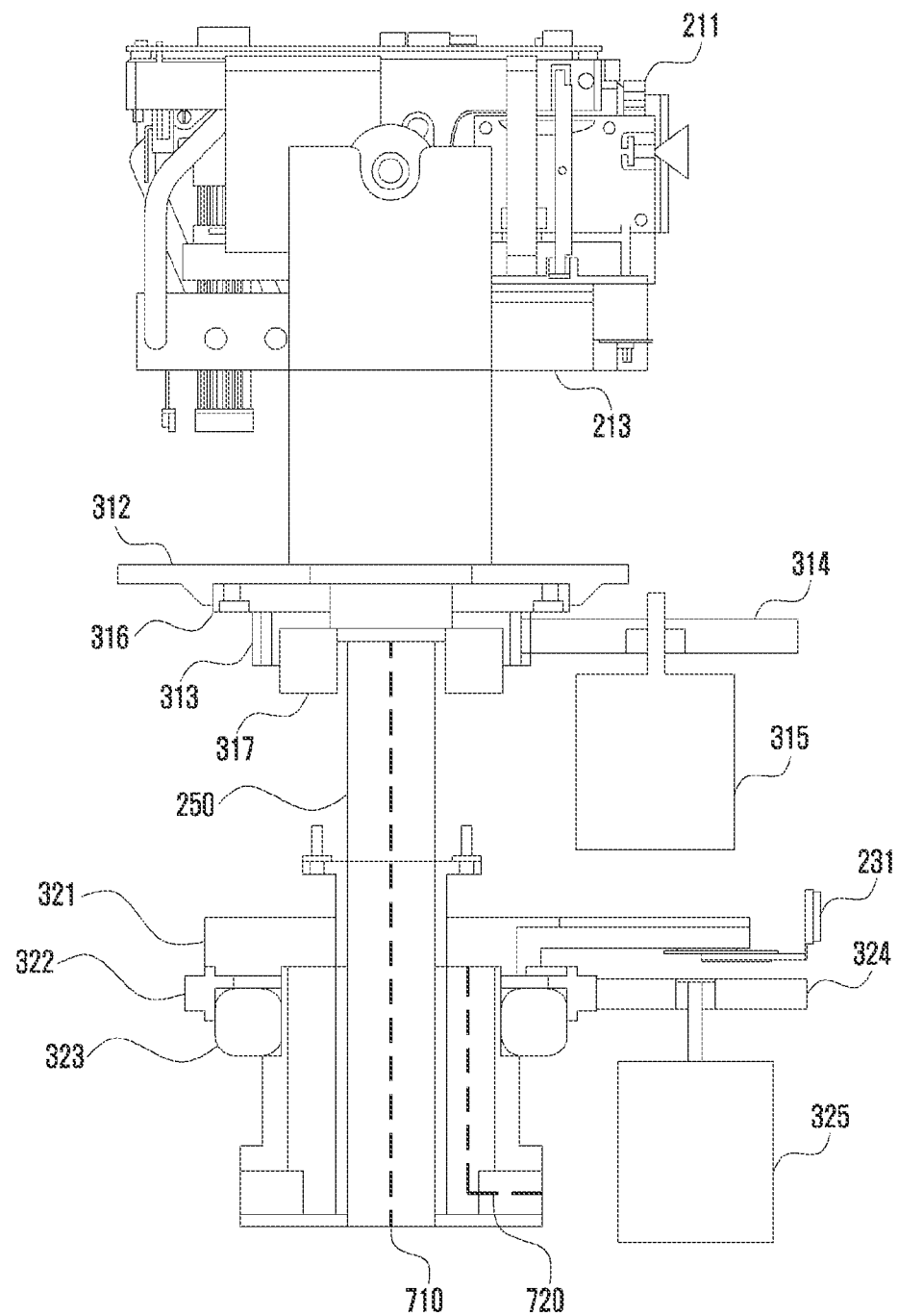

FIGS. 7A and 7B are diagrams illustrating side views of an internal structure of the electronic apparatus 200 according to various embodiments. FIG. 7A is a diagram illustrating an internal structure of the electronic apparatus 200 from which the housing of the electronic apparatus 200 has been removed and is viewed from a side according to various embodiments. FIG. 7B is a cross-sectional side view of an internal structure of the electronic apparatus 200 according to various embodiments. A description of contents redundant with those described with reference to FIGS. 4A and 4B may not be repeated.

Referring to FIGS. 7A and 7B, the first driving device according to various embodiments may be disposed within the first housing 220, may be coupled to the projector module 210 and the first housing 220, and may deliver electric power to each of the projector module 210 and the first housing 220.

The first driving device according to various embodiments may include a first motor (not illustrated) (e.g., the first motor 311 in FIG. 4A) coupled to the projector 211 of the projector module 210 and having a rotation axis identical with the second axis (e.g., the Y axis in FIG. 2B), the first rotation member 312 coming into contact with at least a part of an internal surface of the first housing 220, the first gear 313 disposed to rotate in the direction of the first axis (e.g., the X axis in FIG. 2B) along with the first rotation member 312, a first bracket 316 fixed and coupled to the first gear 313, a first bearing 317, and the second motor 315 including the first pinion gear 314 geared with the first gear 313. The first motor of the first driving device is covered by the projector 211 and not illustrated in FIG. 7A.

According to various embodiments, in order to rotate the projector module 210 in the direction of the first axis, the first housing 220 brought into contact with the first rotation member 312 may be rotated in the direction of the first axis by rotating the first pinion gear 314 in response to the driving of the second motor 315, rotating the first gear 313 geared with the first pinion gear 314, rotating the first rotation member 312 in response to the rotation of the first gear 313. According to various embodiments, the projector module 210 may rotate in subordination to the rotation of the first housing 220 in the direction of the first axis. Accordingly, the projector module 210 may be rotated in the direction of the first axis by the rotation of the first housing 220 in the direction of the first axis. According to various embodiments, the projector module 210 may be rotated in the direction of the first axis by 360 degrees.

According to various embodiments, in order for the projector module 210 to rotate in the direction of the second axis (e.g., the Y axis in FIG. 2B), the projector module 210 may rotate in the direction of the second axis as the projector 211 of the projector module 210 rotates in the direction of the second axis by electric power (or rotation torque) supplied by the driving of the first motor (not illustrated). According to various embodiments, the rotation of the projector module 210 in the direction of the second axis may be rotation independent of the first housing 220. According to various embodiments, a rotation angle of the projector module 210 in the direction of the second axis may be 0 degrees or more to 90 degrees or less.

According to various embodiments, the second driving device may include the second rotation member 321, the second gear 322, the second bearing 323, and the fourth motor 325 including the second pinion gear 324. The second rotation member 321 may be a rotation member disposed within the vision sensor module 230, for example, in a way to be rotatable in the direction of the first axis. The second gear 322 may be a gear disposed to rotate in the direction of the first axis along with the second rotation member 321, for example. The second pinion gear 324 of the fourth motor 325 may be a pinion gear meshed with the second gear 322, for example.

According to various embodiments, in order to rotate the vision sensor module 230 in the direction of the first axis, the vision sensor module 230 may be rotated in the direction of the first axis by rotating the second pinion gear 324 in response to the driving of the fourth motor 325, rotating the second gear 322 geared with the second pinion gear 324, and rotating the second rotation member 321 in response to the rotation of the second gear 322.

According to various embodiments, the electronic apparatus 200 may include the cylindrical pillar 250 penetrating the vision sensor module 230. The pillar 250 may be disposed to penetrate the vision sensor module 230, the first gear 313 of the first driving device, and the second gear 322 of the second driving device, for example. For example, the vision sensor module 230, the first gear 313 of the first driving device and the second gear 322 of the second driving device may be coupled to the pillar, and may rotate in the direction of the first axis.

According to various embodiments, the projector module 210 may be electrically connected to various system elements (e.g., the processor) disposed within the second housing 240 through the electric wiring of the inner surface of the pillar 250. A dotted line 710 may refer, for example, to an electric wiring path within the pillar that electrically connects the projector module 210 and a system element.

According to various embodiments, the vision sensor module 230 may be electrically connected to various system elements (e.g., the processor) disposed within the second housing 240 through the electric wiring of the inner surface of the pillar 250, and may be electrically connected to various system elements disposed within the second housing 240 through electric wring of an empty space outside the pillar 250. The dotted line 720 may refer, for example, to an electric wiring path of the empty space outside the pillar.

Figure 8A:
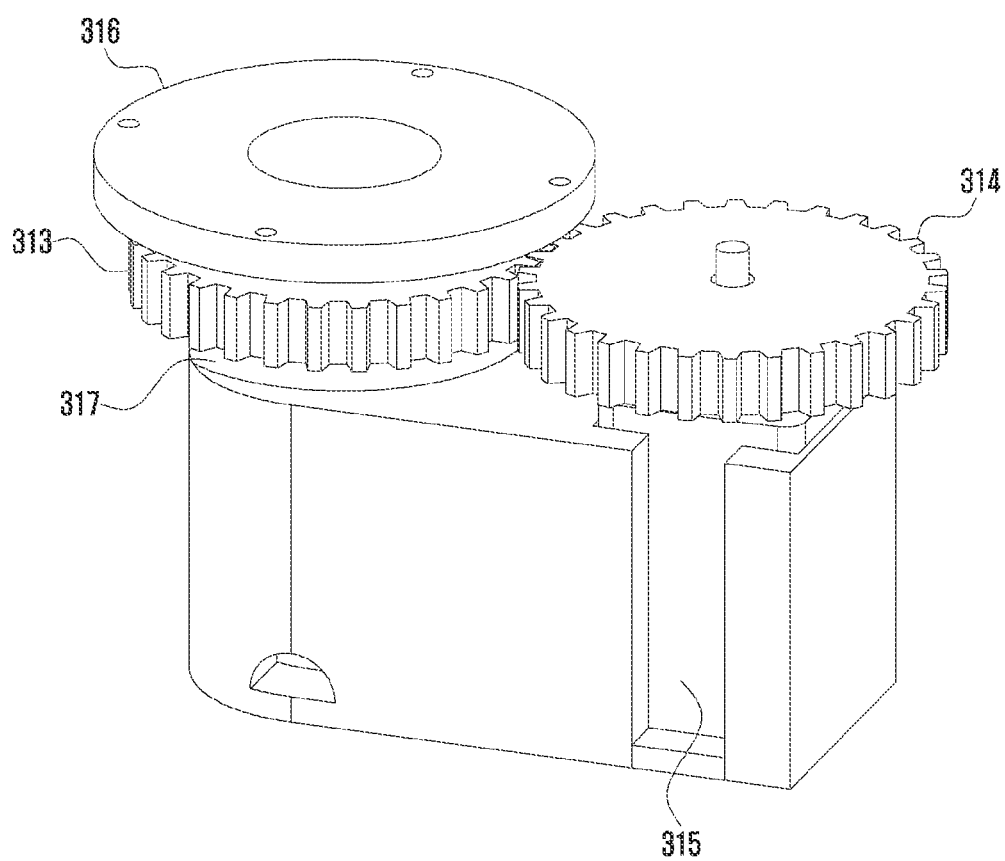
FIGS. 8A and 8B are diagrams illustrating a partial structure of the first driving device according to various embodiments.
Figure 8B:
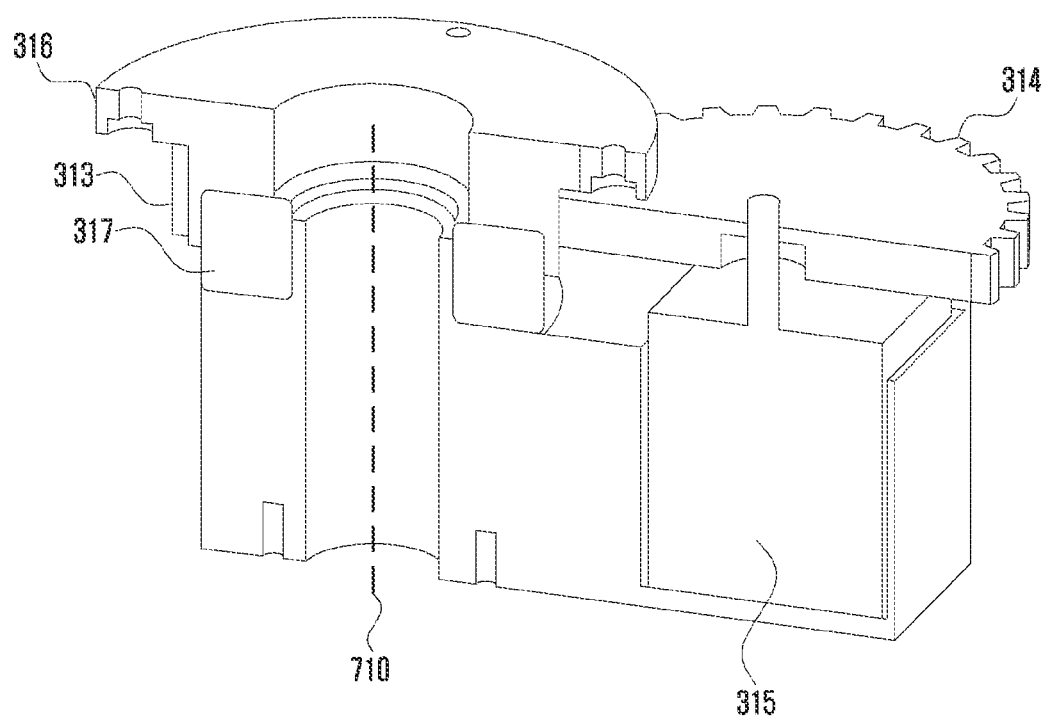

FIGS. 8A and 8B are diagrams illustrating various structures of the first driving device according to various embodiments.

FIG. 8A is a diagram illustrating the first gear 313 disposed to rotate in the direction of the first axis along with the first rotation member 312, the first bracket, the second motor 315 including the first pinion gear 314 geared with the first gear 313, and the first bracket 316 fixing and coupling the first rotation member 312 and the first gear 313 in the first driving device according to various embodiments. FIG. 8B is a cross-sectional view of the elements illustrated in FIG. 8A according to various embodiments.

Referring to FIGS. 8A and 8B, according to various embodiments, the first driving device may include the first gear 313 disposed to rotate in the direction of the first axis along with the first rotation member 312, the first bracket 316 for fixedly coupling the first rotation member 312 and the first gear 313, and the second motor 315 including the first pinion gear 314 geared with the first gear 313 in order to rotate the first housing 220 in the direction of the first axis (e.g., the X axis in FIG. 2B). According to various embodiments, the first driving device may include the first motor (e.g., the first motor 311 in FIG. 4A) in order to rotate the projector module 210 in the direction of the second axis (e.g., the Y axis in FIG. 2B), but a description of the first motor is omitted in this figure.

According to various embodiments, the first housing 220 brought into contact with the first rotation member 312 may be rotated in the direction of the first axis by rotating the first pinion gear 314 in response to the driving of the second motor 315, rotating the first gear 313 meshed with the first pinion gear 314, and rotating the first rotation member 312 fixed and coupled to the first gear 313 through the first bracket 316 in response to the rotation of the first gear 313. According to various embodiments, the projector module 210 may also be rotated in the direction of the first axis due to the rotation of the first housing 220 in the direction of the first axis.

According to various embodiments, the first bracket 316 is an element for fixing and connecting the first gear 313 and the first rotation member 312, and may be an element that enables the first rotation member 312 to also rotate when the first gear 313 rotates.

According to various embodiments, the first bearing 317 may be an element for smoothing a rotation movement by reducing friction resistance attributable to rotation when the first driving device disposed in the first housing 220 rotates around the first axis as the first housing 220 is rotated in the direction of the first axis by the first motor 311, for example.

According to various embodiments, a circular hole may be formed at the center of the first gear 313, the first bracket 316 and the first bearing 317. The first gear 313, the first bearing 317 and the first bracket 316 may be rotatably coupled to the cylindrical pillar (e.g., the pillar 250 in FIG. 7B) through the circular hole. According to various embodiments, the projector module 210 may be electrically connected to a system element (e.g., the processor) disposed within the second housing 240 through the electric wiring within the cylindrical pillar 250.

Figure 9B:
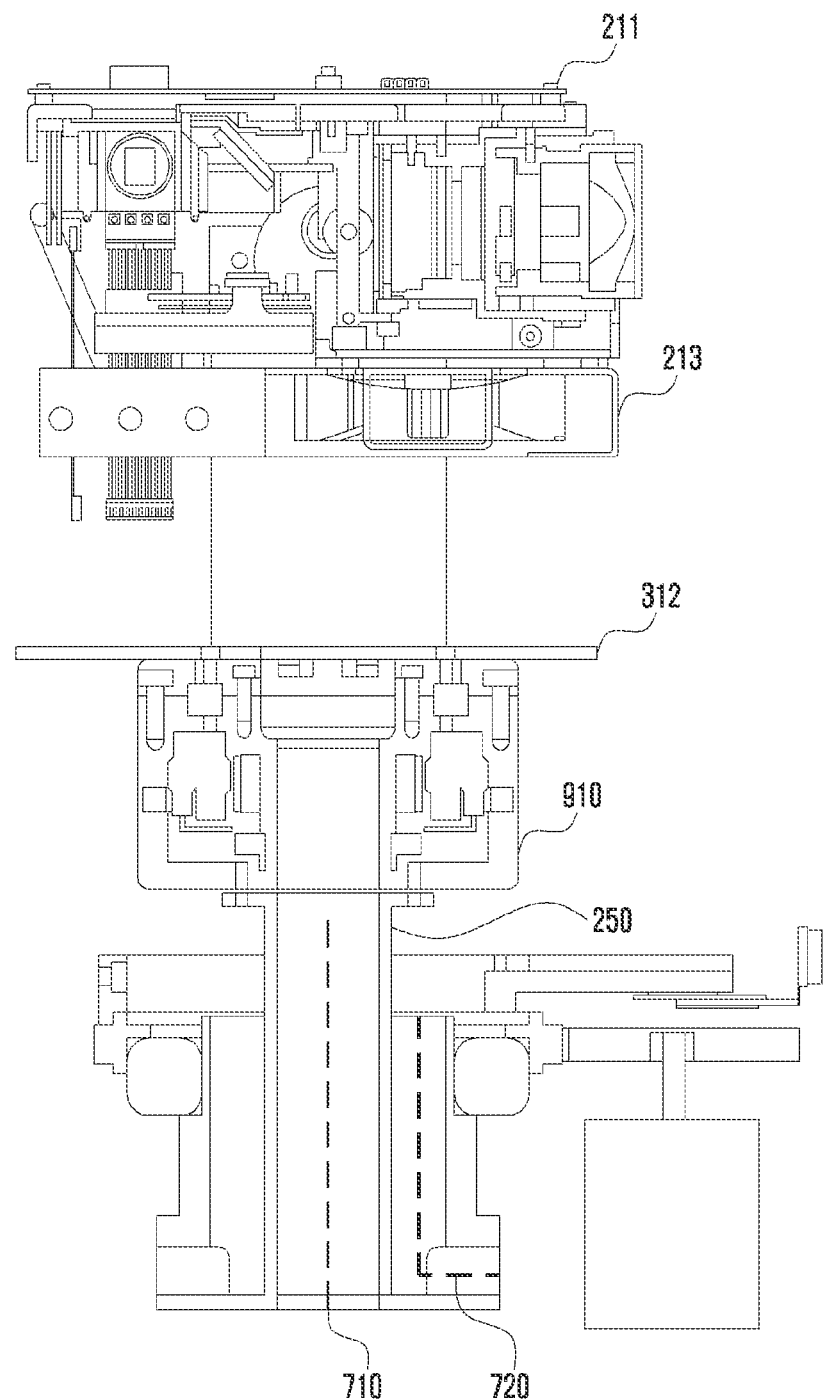

FIGS. 9A and 9B are diagrams illustrating an internal structure of the electronic apparatus 200 according to various embodiments.

Referring to FIGS. 9A and 9B, the projector module 210 according to various embodiments may include the projector 211 and the heat dissipation structure 213 disposed under the projector 211. According to various embodiments, the first motor 311 of the first driving device may be coupled to the projector 211, and may rotate the projector 211 in the direction of the second axis.

The electronic apparatus 200 according to various embodiments may include a third motor 910 capable of directly rotating the first rotation member 312. According to various embodiments, the structure illustrated in FIGS. 8A and 8B may be substituted with the third motor 910 having a ring shape.

The third motor 910 according to various embodiments may be disposed under the first rotation member 312, and may have a rotation axis identical with the first axis (e.g., the X axis in FIG. 2B). The third motor 910 according to various embodiments may rotate the first rotation member 312 in the direction of the first axis by delivering electric power to the first rotation member 312. As the first rotation member 312 rotates in the direction of the first axis, the first housing 220 in contact with the first rotation member 312 may rotate in the direction of the first axis. When the first housing 220 rotates in the direction of the first axis, the projector module 210 coupled to a part of the first housing 220 may rotate in the direction of the first axis along with the first housing 220.

According to various embodiments, the projector module 210 and the vision sensor module 230 may be electrically connected to a system element (e.g., the processor) disposed within the second housing 240 through electric wiring (e.g., the dotted line 710) within the cylindrical pillar 250.

According to various embodiments, the vision sensor module 230 may be electrically connected to a system element (e.g., the processor) disposed within the second housing 240 through electric wiring (e.g., the dotted line 720) of an empty space outside the cylindrical pillar 250.

Figure 10A:
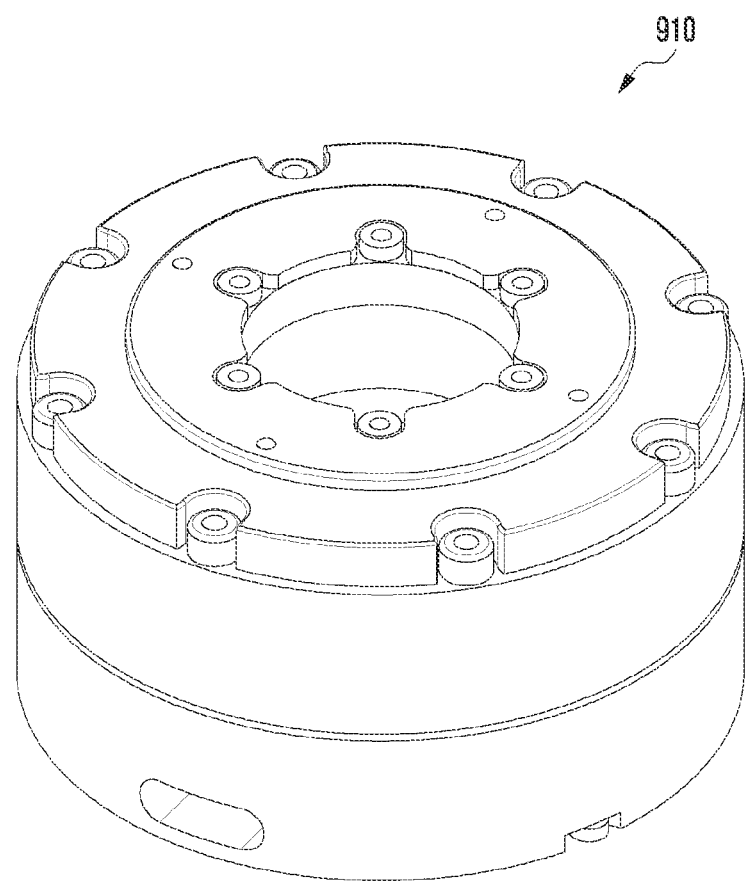
FIGS. 10A, 10B and 10C are diagrams illustrating a third motor according to various embodiments.
Figure 10B:
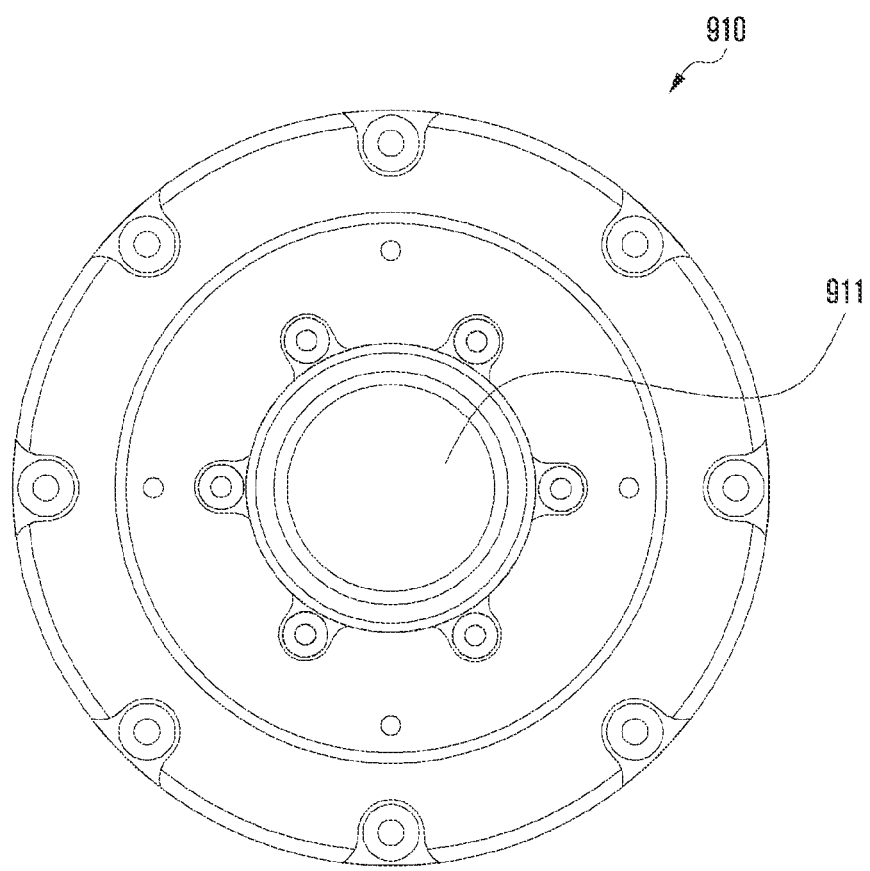
Figure 10C:
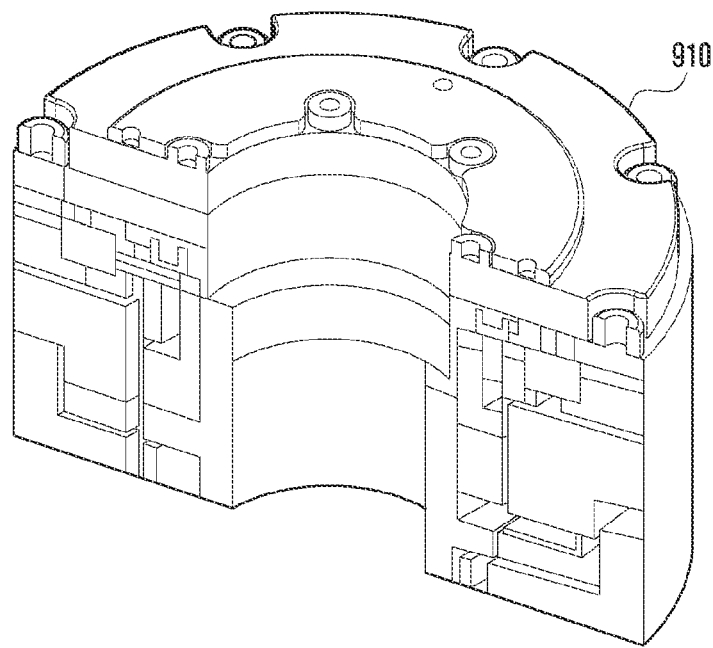

FIGS. 10A, 10B and 10C are diagrams illustrating the third motor according to various embodiments.

FIG. 10A is a perspective view of the third motor according to various embodiments. FIG. 10B is a plan view of the third motor according to various embodiments. FIG. 10C is a cross-sectional side view of the third motor according to various embodiments.

Referring to FIGS. 10A, 10B and 10C, the third motor according to various embodiments may have a ring shape having a circular hole 911 formed at a center thereof, and may be rotatably coupled to a cylindrical pillar (e.g., the pillar 250 in FIG. 7B) through the hole.

The third motor according to various embodiments may have a structure which may be fixed and coupled to the first rotation member 312.

Figure 11A:
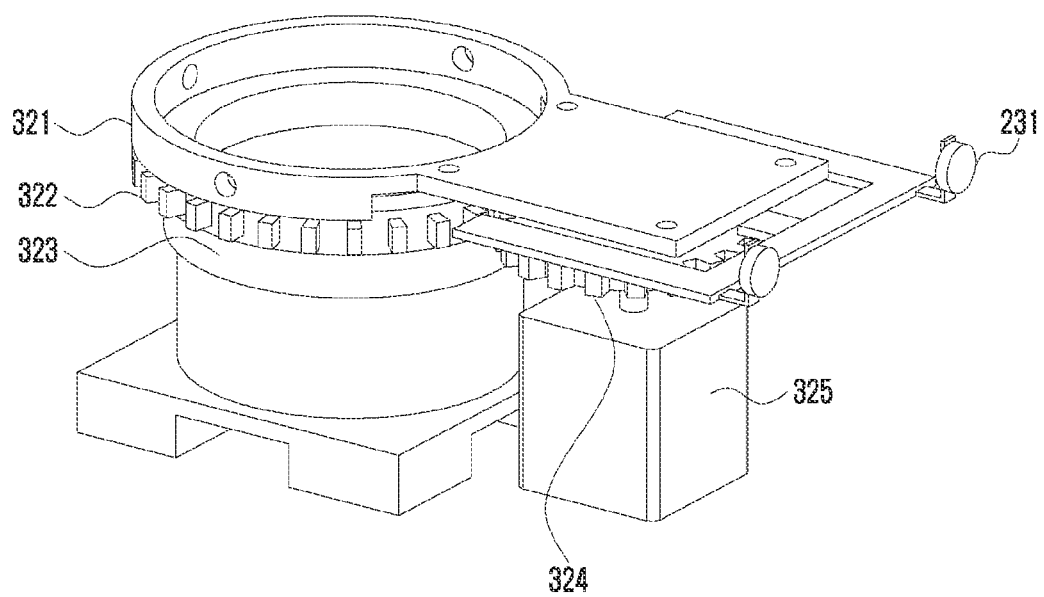
FIGS. 11A and 11B are diagrams illustrating an internal structure of the second driving device and a vision sensor module according to various embodiments.
Figure 11B:
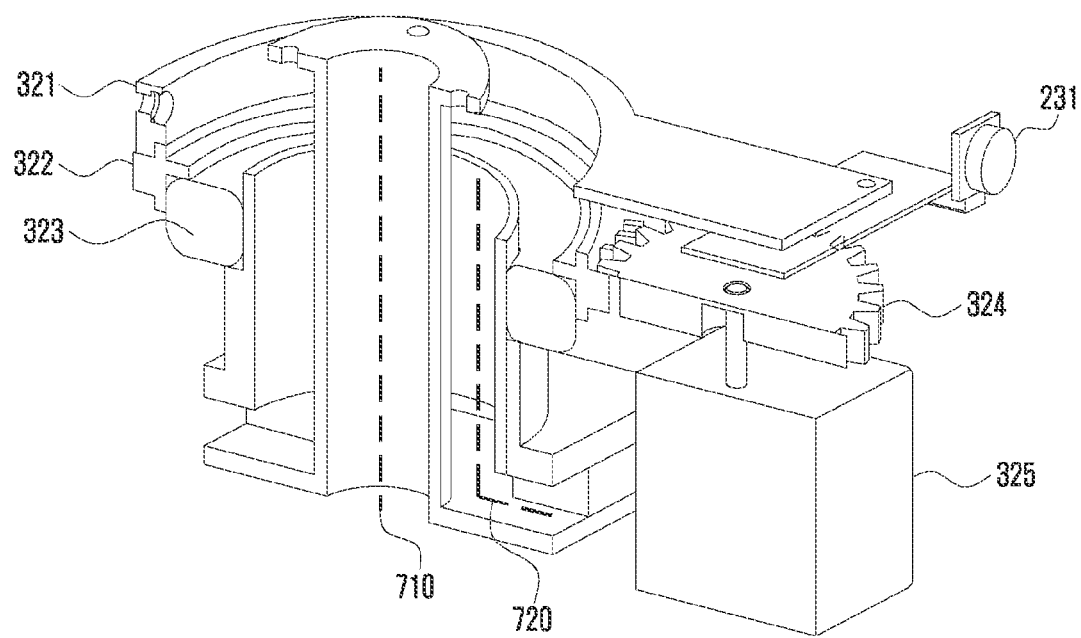

FIGS. 11A and 11B are diagrams illustrating an internal structure of the second driving device and the vision sensor module 230 according to various embodiments.

FIG. 11A is a perspective view of an internal structure of the second driving device and the vision sensor module 230 according to various embodiments. FIG. 11B is a cross-sectional view of the structure illustrated in FIG. 11A according to various embodiments. A description of contents redundant with the aforementioned contents may not be repeated.

Referring to FIGS. 11A and 11B, the second driving device according to various embodiments may include the second rotation member 321, the second gear 322, the second bearing 323, and the fourth motor 325 including the second pinion gear 324. The second rotation member 321 may be a rotation member disposed to be rotatable in the direction of the first axis (e.g., the X axis in FIG. 2B) within the vision sensor module 230, for example. The second gear 322 may be a gear disposed to rotate in the direction of the first axis along with the second rotation member 321, for example. The second pinion gear 324 of the fourth motor may be a pinion gear meshed with the second gear 322, for example. According to various embodiments, the second driving device may be disposed within the second housing 240, and may drive the vision sensor module 230.

According to various embodiments, in order to rotate the vision sensor module 230 in the direction of the first axis, the vision sensor module 230 may be rotated in the direction of the first axis by rotating the second pinion gear 324 in response to the driving of the fourth motor 325, rotating the second gear 322 meshed with the second pinion gear 324, and rotating the second rotation member 321 in response to the rotation of the second gear 322.

According to various embodiments, the second rotation member 321, second gear 322 and second bearing 323 of the second driving device may have a ring shape having a circular hole at the center thereof. A cylindrical pillar (e.g., the pillar 250 in FIG. 7B) may be disposed in the hole. According to various embodiments, the diameter of the hole may be equal to or greater than an external diameter of the cylindrical pillar. When the diameter of the hole is greater than the external diameter of the cylindrical pillar, the pillar may be disposed to pass through the center of the hole. The center of the hole may be a point where the first axis passes through.

According to various embodiments, when the diameter of the hole is equal to the external diameter of the cylindrical pillar, the vision sensor module may be electrically connected to various system elements (e.g., the processor) disposed within the second housing 240 through electric wiring (e.g., the dotted line 710) within the pillar.

According to various embodiments, when the diameter of the hole is greater than the external diameter of the cylindrical pillar, the vision sensor module 230 may have electric wiring (e.g., a dotted line 720) in an empty space between the cylindrical pillar and the hole. The vision sensor module 230 may be electrically connected to various system elements (e.g., the processor) disposed within the second housing 240 through the electric wiring.

According to various embodiments, the second bearing 323 may be an element for smoothing a movement by reducing friction resistance attributable to rotation when the vision sensor module 230 is rotated in the direction of the first axis by the fourth motor, for example.

Figure 12:
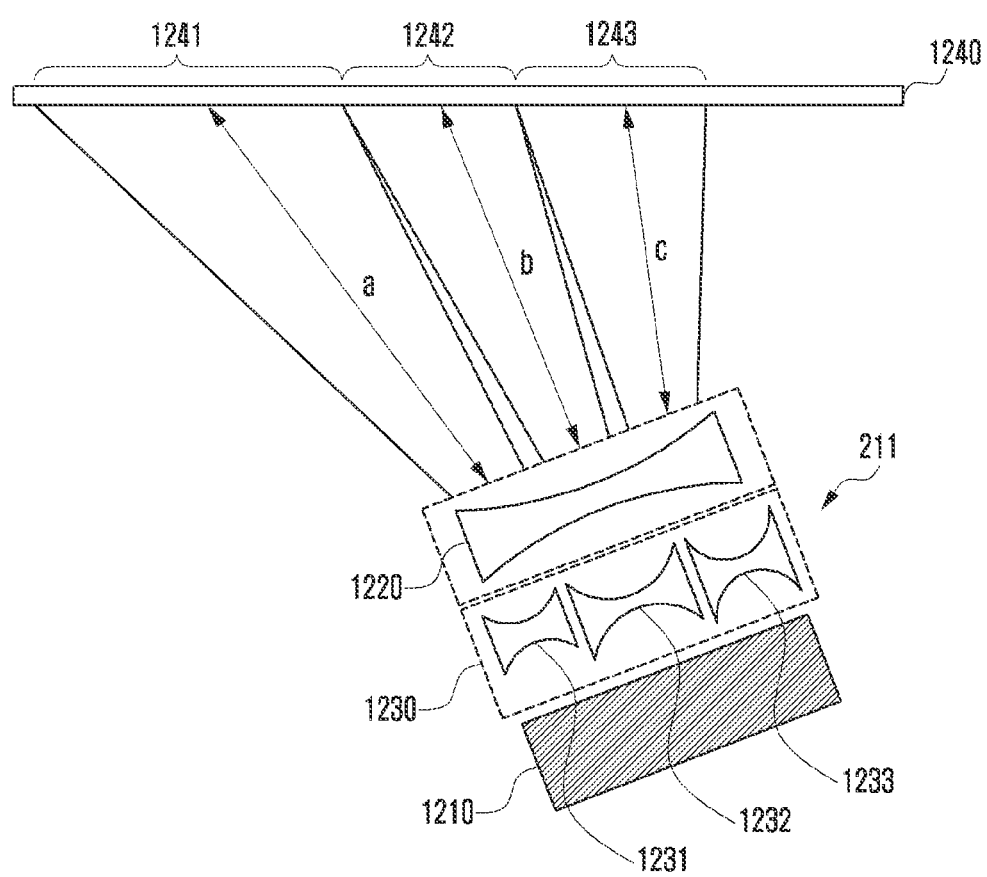
FIG. 12 is a diagram illustrating portions of an internal structure of the projector module according to various embodiments.

FIG. 12 is a diagram illustrating portions of an internal structure of the projector module 210 according to various embodiments.

Referring to FIG. 12, the projector 211 of the projector module 210 according to various embodiments may include a light source 1210, a lens 1220 and a plurality of micro lenses 1230. According to various embodiments, the light source 1210 may be an element for projecting, onto the plurality of micro lenses 1230 and the lens 1220, light related to an image to be projected. For example, the light source 1210 may be an LED lamp or a laser.

According to various embodiments, if the projector module 210 includes only one lens, a phenomenon in which some of a projection region 1240 is not focused may occur because one focal distance is applied to the entire projection region 1240 in a lump. For example, when a normal of the projection region 1240 and a projection direction of the projector 211 are not identical with each other (e.g., when the projector 211 projects an image at a diagonal location of the projection region 1240), a focal distance of the projector module 210 at a portion of the projection region 1240 close to the projector 211 and a focal distance of the projector module 210 at a portion of the projection region 1240 far from the projector 211 may be different. In such a case, since one focal distance is applied to the entire projection region 1240 in a lump, resolution of a projected image may be decreased because some of the projection region 1240 is not focused.

In the projector module 210 according to various embodiments disclosed herein, the plurality of micro lenses 1230 may be disposed between the light source 1210 and the lens 1220. The projector module 210 according to various embodiments may differently adjust a focal distance of the projector module 210 in the projection region 1240 by adjusting arrangement locations and arrangement angles of the plurality of micro lenses 1230.

As illustrated in FIG. 12, it is assumed that three micro lenses 1231, 1232, and 1233 are transversely disposed between the lens 1220 and the light source 1210. Furthermore, it is assumed that if the projection region 1240 is transversely split into three parts, a distance "a" from the projector module 210 to a first split region 1241 is 5 m, a distance "b" from the projector module 210 to a second split region 1242 is 3 m, and a distance "c" from the projector module 210 to a third split region 1243 is 1 m. In such a case, the projector module 210 may adjust an arrangement location and arrangement angle of the micro lens 1231 corresponding to the first split region 1241 so that a focal distance of the projector module 210 becomes 5 m, and may then project an image onto the first split region 1241. For example, the projector module 210 may adjust a distance between the lens 1220 and the micro lens 1231 corresponding to the first split region 1241, and may adjust an angle between the lens 1220 and the micro lens 1231 corresponding to the first split region 1241 so that an image is projected onto the first split region 1241. Likewise, the projector module 210 may adjust an arrangement location and arrangement angle of each of the micro lens 1232 corresponding to the second split region 1242 and the micro lens 1233 corresponding to the third split region 1243, may adjust focal distances of the projector module 210 in the second split region 1242 and the third split region 1243 to 3 m and 1 m, respectively, and may project images onto the second split region 1242 and the third split region 1243.

In the projector module 210 according to various embodiments, each of the plurality of micro lenses 1230 may independently adjust at least one of a distance and an angle with respect to the lens 1220 under the control of the processor.

FIG. 12 illustrates that three micro lenses are disposed as an example, but the number of micro lenses disposed is not limited thereto. The plurality of micro lenses 1230 according to various embodiments maybe disposed in one direction (e.g., a transverse or longitudinal direction), and may be disposed in a grid form (e.g., an m*n form). If the plurality of micro lenses 1230 is disposed in a grid form, the projection region 1240 may be split into a plurality of regions having a grid form, and a focal distance may be adjusted for each split region.

Figure 13:
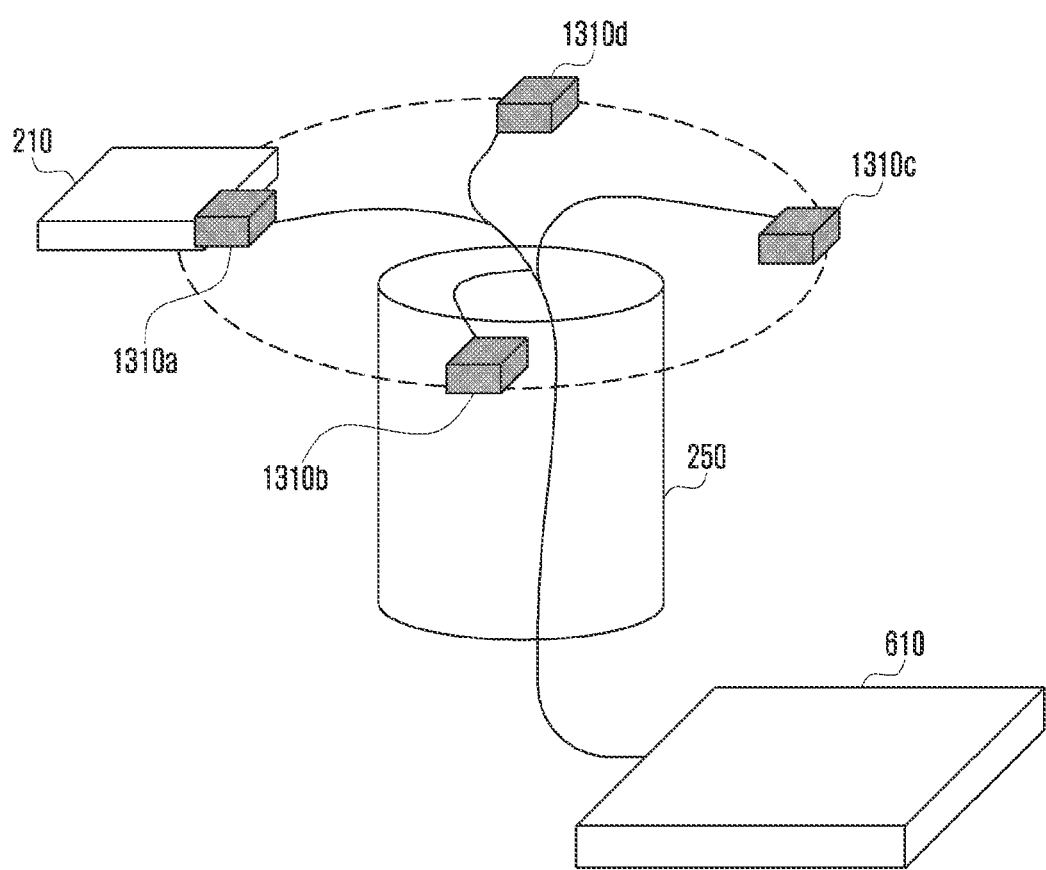
FIG. 13 is a diagram illustrating an example method of enabling the projector module to be electrically connected to a system element according to various embodiments.

FIG. 13 is a diagram illustrating an example method of enabling the projector module 210 to be electrically connected to a system element according to various embodiments.

According to various embodiments, the projector module 210 or the vision sensor module 230 may be electrically connected to various system elements (e.g., the processor) disposed in the second housing 240 through electric wiring within the cylindrical pillar 250 disposed within the electronic apparatus 200.

According to various embodiments, if the projector module 210 is connected to a system element through one cable and rotated therewith, a phenomenon in which the cable is twisted or folded may occur.

Referring to FIG. 13, according to various embodiments, electric wiring for electrically connecting the projector module 210 and a system element (e.g., the processor 610) may include a plurality of connectors 1310a, 1310b, 1310c, and 1310d at the end on one side thereof. The plurality of connectors 1310a, 1310b, 1310c, and 1310d may be elements which are coupled to a connection terminal of the projector module 210, for example, and coupled to a system element (e.g., the processor 610) through the electric wiring. FIG. 13 illustrates that four connectors are disposed at intervals of 90 degrees, but the present disclosure is not limited thereto.

The plurality of connectors 1310a, 1310b, 1310c, and 1310d according to various embodiments may be disposed at a point where the connection terminal of the projector module 210 passes through while the connection terminal of the projector module 210 rotates in the direction of the first axis. For example, the plurality of connectors 1310a, 1310b, 1310c, and 1310d may be spaced apart from one another at given angles. For example, if the projector module 210 rotates in the direction of the first axis, a connector at a location closest to the connection terminal of the projector module 210 among the plurality of disposed connectors 1310a, 1310b, 1310c, and 1310d may be connected to the connection terminal of the projector module 210, so that the projector module 210 may be coupled to a system element through the electric wiring. For example, while the projector module 210 rotates, the projector module 210 may be coupled to the plurality of connectors 1310a, 1310b, 1310c, and 1310d using a hot plug & play method. For example, if the hot plug & play method is used, although a coupled connector is replaced, the projector module 210 may be used without a rebooting or reset operation.

According to various embodiments, an electrical connection method between the projector module 210 and the plurality of connectors 1310a, 1310b, 1310c, and 1310d may include at least one of a pin contact method, a magnetic contact method and a wireless communication method.

The pin contact method may be a method of connecting the projector module 210 and the connector through a contact between a pad having a pogo pin form and a pin, for example. The pin contact method may be suitable for a case where rotation is performed at a low speed or a case where the number of signals delivered is small. The magnetic contact method may be a method for tightly bonding the projector module 210 and the connector using a magnet in the state in which projector module 210 and the connector are coupled, for example. The wireless communication method may be a method of wirelessly delivering a signal using a dongle, for example.

FIGS. 14A, 14B, 14C and 14D are diagrams illustrating an example method of recognizing a plurality of connectors according to various embodiments.

According to various embodiments, if the projector module 210 is repeatedly connected to and separated from the plurality of connectors 1310a, 1310b, 1310c, and 1310d while rotating, the processor 610 may recognize each of the plurality of connectors 1310a, 1310b, 1310c, and 1310d as a new device. When each of the plurality of connectors 1310a, 1310b, 1310c, and 1310d is recognized as a new device, latency may occur every new connection.

According to various embodiments, although the projector module 210 is repeatedly connected to and separated from the plurality of connectors 1310a, 1310b, 1310c, and 1310d while rotating, the processor 610 may recognize each of the plurality of connectors 1310a, 1310b, 1310c, and 1310d as one device. A method of recognizing each of the plurality of connectors 1310a, 1310b, 1310c, and 1310d as one device may be any one of a method using a multiplexer (MUX), a method of recognizing the location of each of the plurality of connectors, a parallel connection method and a serial connection method, for example.

Figure 14A:
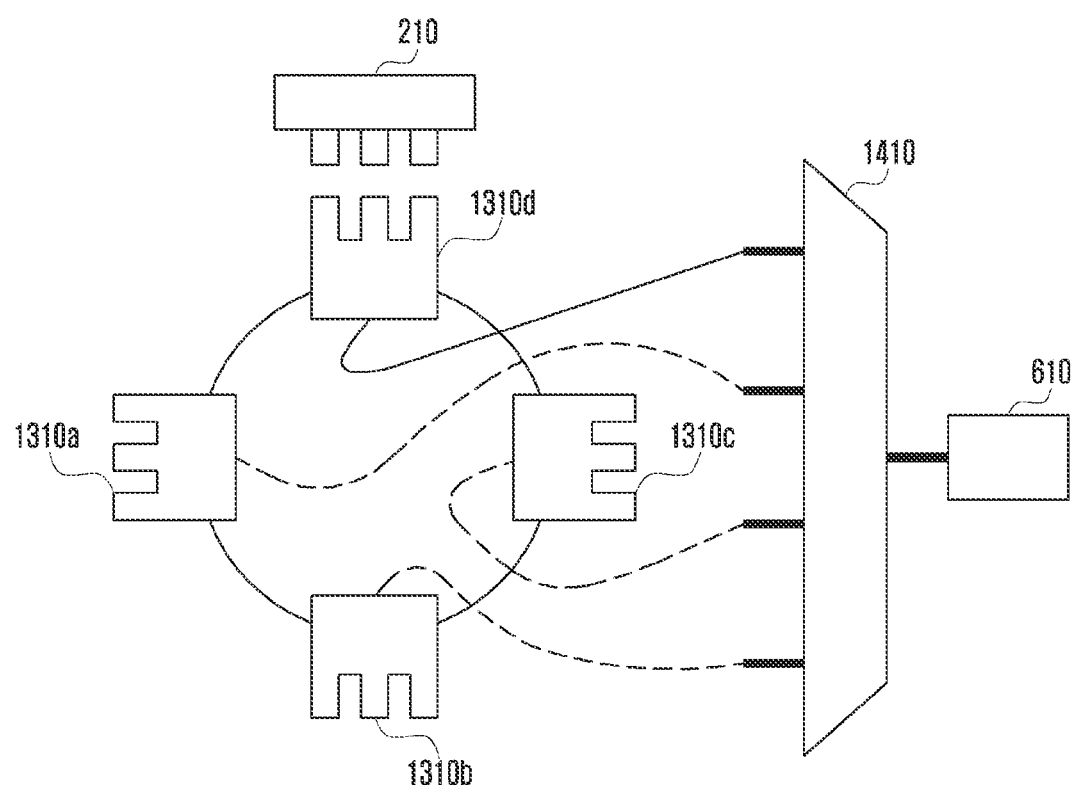
FIGS. 14A, 14B, 14C and 14D are diagrams illustrating an example method of recognizing a plurality of connectors according to various embodiments.

Referring to FIG. 14A, the method of using the multiplexer may be a method of inputting each of the plurality of connectors 1310a, 1310b, 1310c, and 1310d to one multiplexer 1410 and outputting one connected connector 1310d, for example.

Figure 14B:
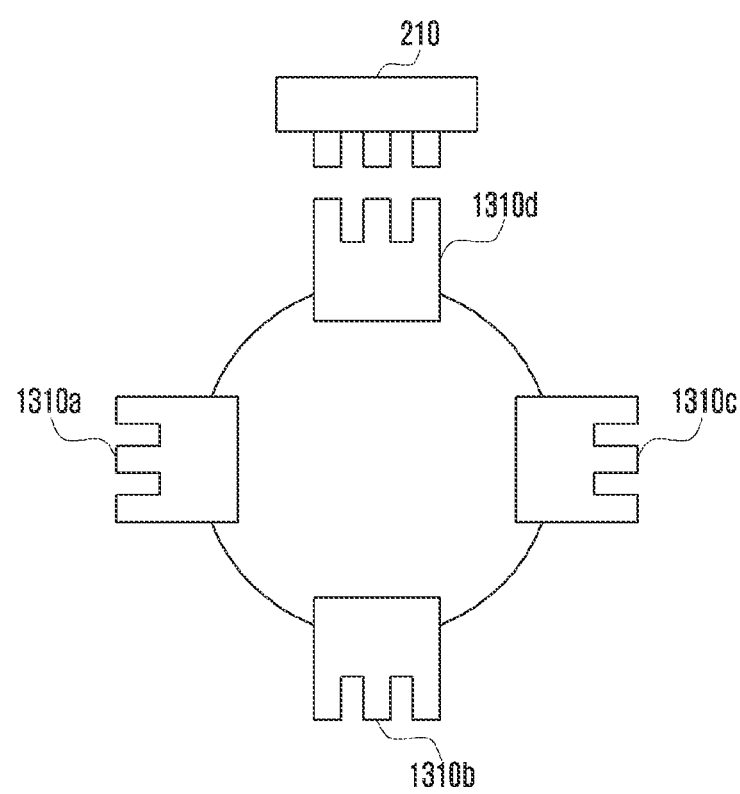

Referring to FIG. 14B, the method using a serial communication port may be a method of mapping each of the plurality of connectors to each port of a serial communication port (COM port), for example. For example, the method using a serial communication port may be a method of identifying the location of a connected connector based on a connected port. The processor 610 may recognize each of the plurality of connectors as one device by mapping the first connector 1310a to COM1 0, the second connector 1310b to COM1 90, the third connector 1310c to COM1 180, and the fourth connector 1310d to COM1 270, for example.

Figure 14C:
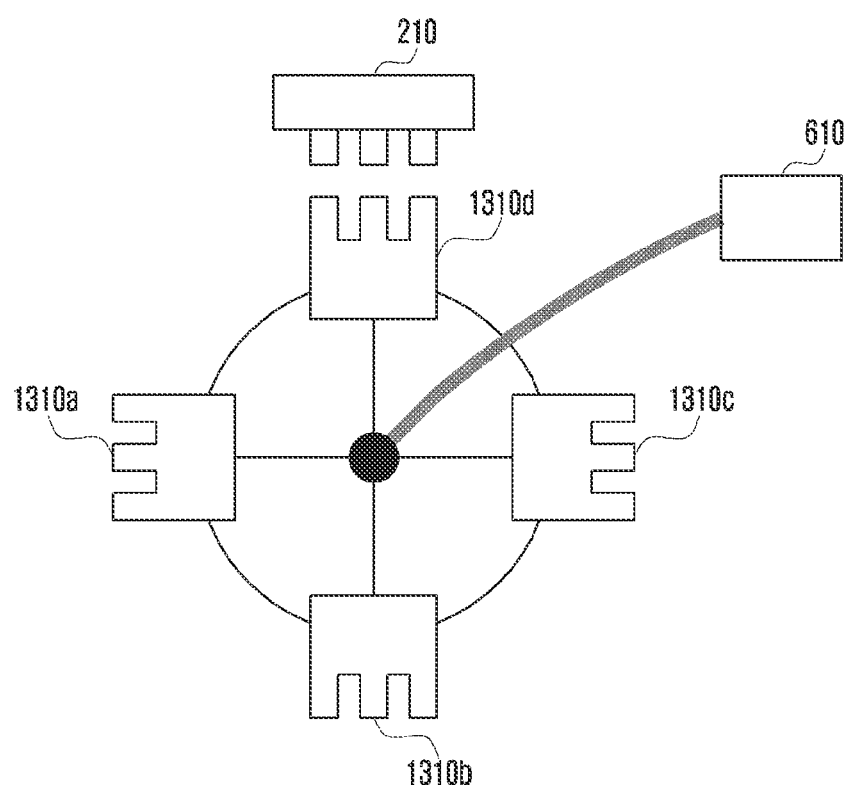
Figure 14D:
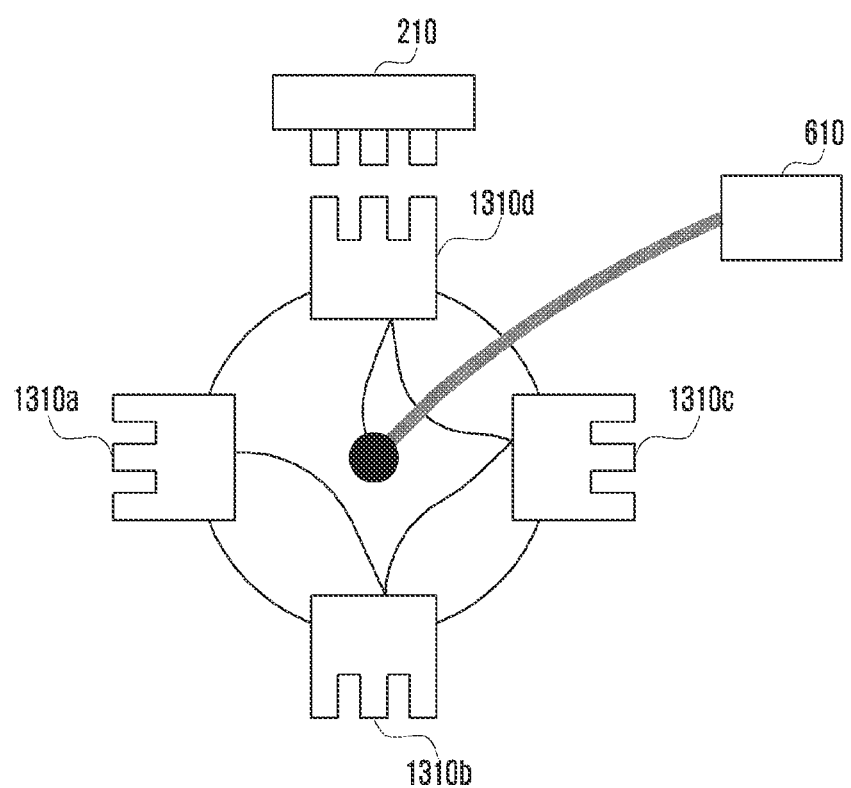

Referring to FIGS. 14C and 14D, the parallel connection method may be a method of connecting the plurality of connectors 1310a, 1310b, 1310c, and 1310d to the processor 610 by connecting the plurality of connectors in parallel, for example. The serial connection method may be a method of connecting the plurality of connectors 1310a, 1310b, 1310c, and 1310d to the processor by connecting each of the plurality of connectors in series, for example. The serial connection method may be a method using a daisy chain, for example.

FIG. 15 is a flowchart illustrating an example operation of the electronic apparatus 200 according to various embodiments.

Referring to a flowchart 1500, in operation 1501, the electronic apparatus 200 (e.g., the electronic apparatus 101 in FIG. 1) according to various embodiments may scan a surrounding space of the electronic apparatus 200 through the vision sensor module 230. For example, the electronic apparatus 200 may scan the surrounding space while rotating the vision sensor module 230 in the direction of the first axis. According to various embodiments, the electronic apparatus 200 may analyze the space where the electronic apparatus 200 is disposed based on information on the surrounding space, which is obtained by scanning the surrounding space of the electronic apparatus 200 through the vision sensor module 230. For example, the vision sensor module 230 may analyze the space in a way to simulate an indoor space based on the results of analysis of a plurality of captured raw images or depth images, and may obtain space information based on the results of the analysis.

In operation 1503, the electronic apparatus 200 according to various embodiments may track an external object (e.g., a user) through the vision sensor module 230. The vision sensor module 230 may generate information related to a movement of the external object by tracking the external object. The information related to a movement of the external object may include measuring whether the external object moves, the direction of a movement of the external object or the distance that the external object has moved. The vision sensor module 230 may be implemented as an event-based vision sensor in order to improve a tracking speed for the external object. The event-based vision sensor may refer, for example, to a sensor for sensing an event related to a movement of the external object. For example, the event-based vision sensor may not transmit data to the processor in the state in which the external object has been stopped, and may transmit, to the processor, information related to the movement when the external object moves. The event-based vision sensor may track the external object based on a change in light including pixels corresponding to the external object, which is generated as the external object moves. If the vision sensor module 230 is an event-based vision sensor, the vision sensor module 230 can improve a tracking speed for the external object by transmitting, to the processor, information related to a movement of the external object only when the external object moves.

In operation 1505, the electronic apparatus 200 according to various embodiments may identify a region where an image will be projected based on the information on the space where the electronic apparatus 200 is disposed and the results of the tracking of the external object. For example, the electronic apparatus 200 may identify a region where the projector module 210 will project an image in a way to select a location corresponding to a different direction not a direction in which the external object is present.

In operation 1507, the electronic apparatus 200 according to various embodiments may identify a distance between the identified region and the electronic apparatus 200 through the vision sensor module 230. The electronic apparatus 200 according to various embodiments may split the identified region into a plurality of regions, and may identify a distance between each of the plurality of split regions and the electronic apparatus 200.

In operation 1509, the electronic apparatus 200 according to various embodiments may control the direction of the projector module 210 so that an image can be projected onto the identified region. For example, the processor may control an image projection direction of the projector module 210 using a method of rotating the first housing 220 in the direction of the first axis and a method of rotating the projector module 210 in the direction of the second axis by driving the first driving device.

In operation 1511, the electronic apparatus 200 according to various embodiments may adjust a focal distance of the projector module 210 based on the distance between the identified region and the electronic apparatus 200. According to various embodiments, when the distance between each of the plurality of split regions and the electronic apparatus 200 is identified, the focal distance of the projector module 210 may be adjusted so that each of the plurality of split regions is focused.

In operation 1513, the electronic apparatus 200 according to various embodiments may project an image onto a region identified through the projector module 210.

Figure 16A:
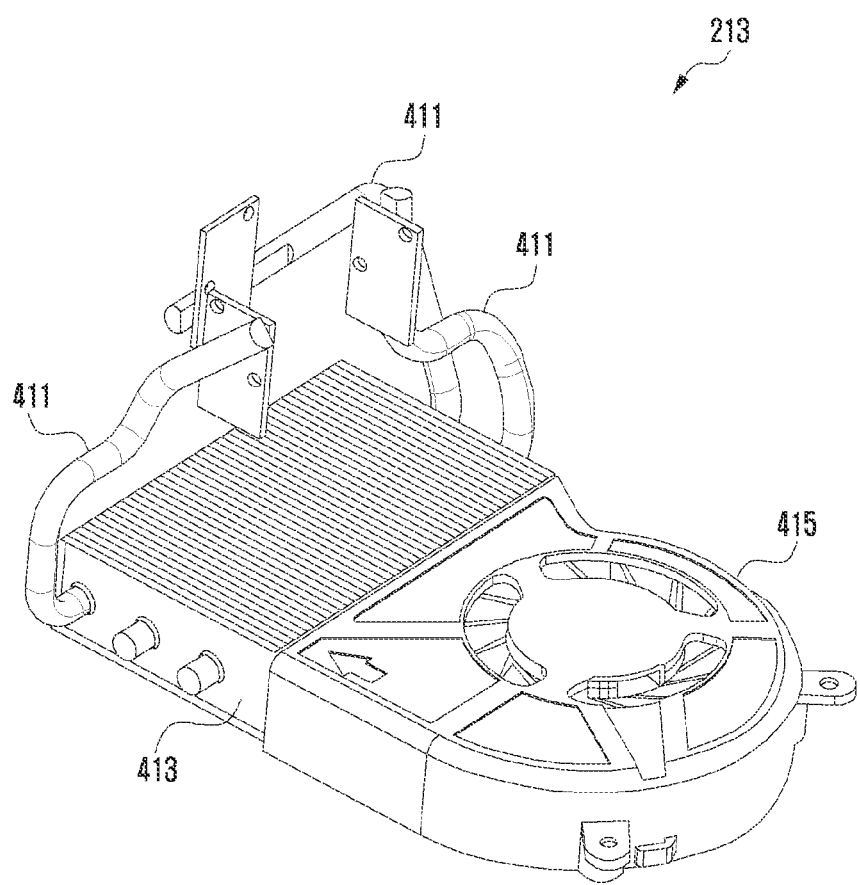
FIG. 16A is a diagram illustrating a heat dissipation structure according to various embodiments.
Figure 16B:
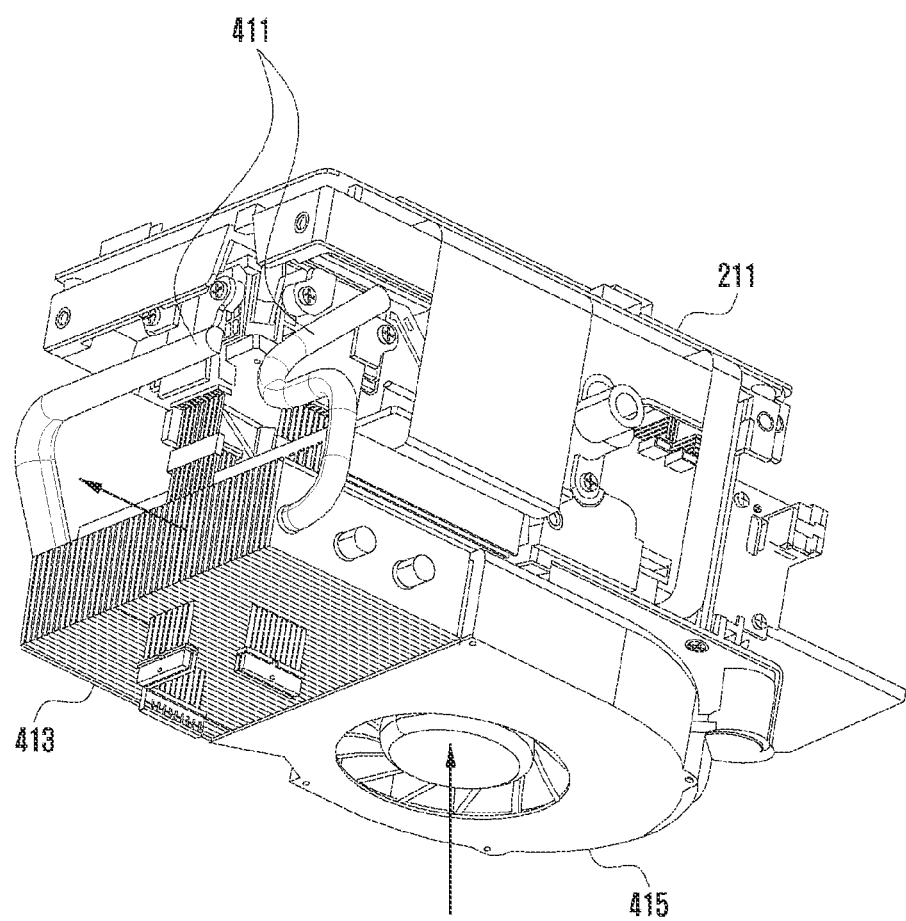
FIG. 16B is a diagram illustrating the heat dissipation structure coupled to a projector according to various embodiments.

FIG. 16A is a diagram illustrating a heat dissipation structure according to various embodiments. FIG. 16B is a diagram illustrating the heat dissipation structure coupled to the projector according to various embodiments.

Referring to FIG. 16A, the heat dissipation structure 213 according to various embodiments may include at least one heat pipe 411, a heat sink 413 and a fan structure 415. According to various embodiments, the heat dissipation structure 213 may be disposed under the projector 211 and coupled to the projector 211.

The at least one heat pipe 411 according to various embodiments may be a structure for delivering, to the heat sink 413, heat generated from the projector 211. At least one heat pipe 411 may be coupled to the projector 211 and the heat sink 413. The at least one heat pipe 411 may be coupled near the light source of the projector 211 in order to efficiently deliver, to the heat sink 413, heat generated from a light source, that is, a heating element of the projector 211, for example. FIG. 16A is a diagram illustrating the heat dissipation structure 213 including three heat pipes 411 according to various embodiments, but the number of heat pipes 411 is not limited thereto. If the heat dissipation structure 213 includes the plurality of heat pipes 411, the plurality of heat pipes 411 may be designed to have the same length.

The heat sink 413 according to various embodiments may be an element for discharging, to the outside of the electronic apparatus 200, heat delivered through the heat pipe 411 using an air blast supplied by the fan structure 415. The heat sink 413 may be disposed under the light source, that is, a heating element of the projector 211, for example. For example, if the heat sink 413 is disposed under the light source of the projector 211, the lengths of the plurality of heat pipes 411 connecting the projector 211 and the heat sink 413 may be identically formed. If the lengths of the plurality of heat pipes 411 are identically formed, heat dissipation efficiency of the heat dissipation structure 213 can be maximized by maximizing heat delivery efficiency of the plurality of heat pipes 411.

The fan structure 415 according to various embodiments may supply an air blast so that heat absorbed by the heat sink 413 is forcedly transferred toward the outside of the electronic apparatus 200. The fan structure 415 may suck the air through an inlet at a bottom thereof, for example, and may supply an air blast to the heat sink 413 using the sucked air. The fan structure 415 may be disposed on one side of the heat sink 413 so that an air blast can be supplied to the heat sink 413, for example. According to various embodiments, the heat sink 413 and the fan structure 415 may be configured to be at least partially disposed substantially in the same plane.

Referring to FIG. 16B, the heat dissipation structure 213 according to various embodiments may be disposed under the projector 211 and coupled to the projector 211.

According to various embodiments, the at least one heat pipe 411 may be coupled near a light source, that is, a heating element of the projector 211, and coupled to one side of the heat sink 413.

According to various embodiments, heat generated from the projector 211 may be delivered to the heat sink 413 through the at least one heat pipe 411.

According to various embodiments, the fan structure 415 may suck the air through the inlet at the bottom thereof. The fan structure 415 may supply an air blast to the heat sink 413 using the sucked air so that heat absorbed by the heat sink 413 is forcedly transferred toward the outside of the electronic apparatus 200. The fan structure 415 may forcedly transfer heat absorbed within the heat sink 413 by supplying an air blast toward the outlet 223 formed in a part of the first housing 220 of the electronic apparatus 200, for example.

According to various embodiments, when an air blast is supplied to the heat sink 413, heat absorbed by the heat sink 413 through the at least one heat pipe 411 may be discharged to the other side of the heat sink 413, that is, a side opposite to one side where the fan structure 415 is disposed. The discharged heat may be discharged to the outside of the electronic apparatus 200 through at least one outlet 223 formed in a part of the first housing 220.

The electronic apparatus 200 (e.g., the electronic apparatus 101 in FIG. 1) according to various example embodiments may include: the first housing rotatable around the first axis, the projector module including a projector coupled to a part of the first housing and rotatable around the second axis perpendicular to the first axis, the vision sensor module including a vision sensor rotatable around the first axis, the second housing, the first driving device including a motor disposed within the first housing and configured to deliver electric power to each of the projector module and the first housing, and the second driving device including a motor disposed within the second housing and configured to deliver electric power to the vision sensor module. The projector module may be configured to rotate in the direction of the second axis independently of the first housing. The vision sensor module may be configured to rotate in the direction of the first axis independently of the first housing.

In the electronic apparatus (e.g., the electronic apparatus 101 in FIG. 1) according to various example embodiments, the projector module may rotate along with the first housing in subordination to the rotation of the first housing in the direction of the first axis.

In the electronic apparatus (e.g., the electronic apparatus 101 in FIG. 1) according to various example embodiments, the vision sensor module may be disposed at the top of the second housing and the first housing may be disposed at the top of the vision sensor module, thereby being capable of forming a stack type structure.

The electronic apparatus (e.g., the electronic apparatus 101 in FIG. 1) according to various example embodiments may further include the cylindrical pillar that penetrates the vision sensor module and that has the first axis as a center axis. The vision sensor module may be coupled to the pillar in a way to be rotatable in the direction of the first axis.

In the electronic apparatus (e.g., the electronic apparatus 101 in FIG. 1) according to various example embodiments, the first axis (e.g., the X axis in FIG. 2B) may be an axis fixed within the electronic apparatus and perpendicular to the bottom of the second housing. The second axis (e.g., the Y axis in FIG. 2B) may be an axis fixed within the electronic apparatus and perpendicular to the first axis.

In the electronic apparatus (e.g., the electronic apparatus 101 in FIG. 1) according to various example embodiments, the first driving device may include the first motor coupled to the projector module and having a rotation axis identical with the second axis, the first rotation member coming into contact with at least a part of an internal surface of the first housing, the first gear disposed to rotate in the direction of the first axis along with the first rotation member, and the second motor including the first pinion gear geared with the first gear. The projector module may rotate in the direction of the second axis in response to the driving of the first motor. The first housing may rotate in the direction of the first axis as the first gear and the first rotation member are rotated by the driving of the second motor.

In the electronic apparatus (e.g., the electronic apparatus 101 in FIG. 1) according to various example embodiments, the first driving device may include the first motor coupled to the projector module and having a rotation axis identical with the second axis, the first rotation member coming into contact with at least a part of an internal surface of the first housing, and the third motor disposed in the first rotation member and having a rotation axis identical with the first axis. The first housing may be rotated in the direction of the first axis as the projector module is rotated in the direction of the second axis by the driving of the first motor and the first rotation member is rotated by the driving of the third motor.

In the electronic apparatus (e.g., the electronic apparatus 101 in FIG. 1) according to various example embodiments, the second driving device may include the second rotation member disposed to be rotatable in the direction of the first axis within the vision sensor module, the second gear disposed to rotate in the direction of the first axis along with the second rotation member, and the fourth motor including the second pinion gear geared with the second gear. The vision sensor module may rotate in the direction of the first axis as the second gear and the second rotation member are rotated by the driving of the fourth motor.

In the electronic apparatus (e.g., the electronic apparatus 101 in FIG. 1) according to various example embodiments, the vision sensor module may include two or more vision sensors spaced apart from one another at given intervals.

In the electronic apparatus (e.g., the electronic apparatus 101 in FIG. 1) according to various example embodiments, the projector module may include the projector and the heat dissipation structure disposed under the projector. The first housing may include at least one outlet from which the air within the electronic apparatus is drained. The heat dissipation structure may discharge heat discharged from the projector through the at least one outlet.

The electronic apparatus (e.g., the electronic apparatus 101 in FIG. 1) according to various example embodiments may further include at least one of the processor, the at least one speaker, the array microphone, the driving device control board and the motor driver disposed within the second housing.

The electronic apparatus (e.g., the electronic apparatus 101 in FIG. 1) according to various example embodiments may further include the cylindrical pillar penetrating the vision sensor module and having the first axis as a center axis. The projector module may be electrically connected to the processor through the electric wiring within the pillar.

In the electronic apparatus (e.g., the electronic apparatus 101 in FIG. 1) according to various example embodiments, the electric wiring may include the plurality of connectors for being electrically connected to the projector module at an end on one side. The plurality of connectors may be spaced apart from one another at given angles.

In the electronic apparatus (e.g., the electronic apparatus 101 in FIG. 1) according to various example embodiments, an electrical connection method between the projector module and the plurality of connectors may include at least one of the pin contact method, the magnetic contact method and the wireless communication method.

In the electronic apparatus (e.g., the electronic apparatus 101 in FIG. 1) according to various example embodiments, a method of recognizing the plurality of connectors may be the method using the multiplexer, the method using the serial communication port, the parallel connection method or the serial connection method.

In the electronic apparatus (e.g., the electronic apparatus 101 in FIG. 1) according to various example embodiments, the processor may obtain information on a surrounding space by scanning the surrounding space of the electronic apparatus through the vision sensor module, may track an external object through the vision sensor module, may identify a region where an image will be projected based on the information on the space and the results of the tracking of the external object, may rotate the projector module and the first housing so that an image can be projected onto the identified region, and may control the projector module to project an image onto the identified region.

In the electronic apparatus (e.g., the electronic apparatus 101 in FIG. 1) according to various example embodiments, the processor may identify a distance between the identified region and the electronic apparatus through the vision sensor module, and may adjust a focal distance of the projector module based on the identified distance.

In the electronic apparatus (e.g., the electronic apparatus 101 in FIG. 1) according to various example embodiments, the projector of the projector module may include the light source, the lens and the plurality of micro lenses. The plurality of micro lenses may be disposed between the light source and the lens.

In the electronic apparatus (e.g., the electronic apparatus 101 in FIG. 1) according to various example embodiments, the projector may independently adjust at least one of a distance and angle of each of the plurality of micro lenses with respect to the lens.

In the electronic apparatus (e.g., the electronic apparatus 101 in FIG. 1) according to various example embodiments, the plurality of micro lenses may be disposed in a grid form.

The electronic apparatus according to various embodiments may be one of various types of electronic apparatuses. The electronic apparatuses may include, for example, a portable communication device (e.g., a smartphone), a computer device, a portable multimedia device, a portable medical device, a camera, a wearable device, a home appliance, or the like. According to an embodiment of the disclosure, the electronic apparatuses are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic apparatus 101). For example, a processor (e.g., the processor 120) of the machine (e.g., the electronic apparatus 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic apparatus comprising:
a first housing rotatable around a first axis;
a projector module including a projector coupled to a part of the first housing and rotatable around a second axis perpendicular to the first axis;
a vision sensor module including a vision sensor rotatable around the first axis;
a second housing;
a first driving device including a driving motor disposed within the first housing and configured to deliver electric power to each of the projector module and the first housing; and
a second driving device including a driving motor disposed within the second housing and configured to deliver electric power to the vision sensor module,
wherein the projector module is rotatable in a direction of the second axis independently of the first housing, and the vision sensor module is rotatable in a direction of the first axis independently of the first housing.

2. The electronic apparatus of claim 1, wherein the projector module is configured to rotate in subordination to the rotation of the first housing in the direction of the first axis.

3. The electronic apparatus of claim 1, wherein:
the vision sensor module is disposed at a top of the second housing,
the first housing is disposed at a top of the vision sensor module, and the vision sensor module and the first housing form a stack type structure.

4. The electronic apparatus of claim 1, further comprising a cylindrical pillar penetrating the vision sensor module and having the first axis as a center axis,
wherein the vision sensor module is coupled to the pillar to be rotatable in the direction of the first axis.

5. The electronic apparatus of claim 1, wherein:
the first axis is an axis fixed within the electronic apparatus and perpendicular to a bottom of the second housing, and
the second axis is an axis fixed within the electronic apparatus and perpendicular to the first axis.

6. The electronic apparatus of claim 1, wherein the first driving device comprises:
a first motor coupled to the projector module and having a rotation axis identical with the second axis;
a first rotation member comprising a plate and contacting at least a part of an internal surface of the first housing;
a first gear disposed to rotate in the direction of the first axis along with the first rotation member; and
a second motor comprising a first pinion gear geared with the first gear, wherein the projector module configured to rotate in the direction of the second axis by the driving of the first motor, and the first housing is configured to rotate in the direction of the first axis as the first gear and the first rotation member rotate by the driving of the second motor.

7. The electronic apparatus of claim 1, wherein the first driving device comprises:
a first motor coupled to the projector module and having a rotation axis identical with the second axis;
a first rotation member comprising a plate and contacting at least a part of an internal surface of the first housing; and
a third motor disposed in the first rotation member and having a rotation axis identical with the first axis,
wherein the first housing is configured to rotate in the direction of the first axis as the projector module rotates in the direction of the second axis by the driving of the first motor and the first rotation member configured to rotate by the driving of the third motor.

8. The electronic apparatus of claim 1, wherein the second driving device comprises:
a second rotation member comprising a plate configured to rotate in the direction of the first axis within the vision sensor module;
a second gear configured to rotate in the direction of the first axis along with the second rotation member; and
a fourth motor comprising a second pinion gear geared with the second gear,
wherein the vision sensor module is configured to rotate in the direction of the first axis as the second gear and the second rotation member are configured to rotate by the driving of the fourth motor.

9. The electronic apparatus of claim 1, wherein:
the projector module comprises a projector and a heat dissipation structure comprising a heat sink disposed under the projector,
the first housing comprises at least one outlet configured to drain air from within the electronic apparatus, and
the heat dissipation structure is configured to discharge heat discharged from the projector through the at least one outlet.

10. The electronic apparatus of claim 1, further comprising at least one of a processor, at least one speaker, an array microphone, a driving device control board and a motor driver disposed within the second housing.

11. The electronic apparatus of claim 10, further comprising a cylindrical pillar penetrating the vision sensor module and having the first axis as a center axis, wherein the projector module is electrically connected to the processor through electric wiring within the pillar,
the electric wiring comprises a plurality of connectors configured to electrically connect to the projector module at an end on one side thereof, and
the plurality of connectors is spaced apart from one another at given angles.

12. The electronic apparatus of claim 11, wherein:
an electrical connection between the projector module and the plurality of connectors comprises at least one of a pin contact method, a magnetic contact method and a wireless communication method, and
a method of recognizing the plurality of connectors comprises a method using a multiplexer, a method using a serial communication port, a parallel connection method or a serial connection method.

13. The electronic apparatus of claim 10, wherein the processor is configured to:
obtrain information on a surrounding space of the electronic apparatus by scanning the space through the vision sensor module,
track an external object through the vision sensor module,
identify a region where an image is to be projected based on the information on the space and results of the tracking of the external object,
rotate the projector module and the first housing so that an image is able to be projected onto the identified region,
identify a distance between the identified region and the electronic apparatus through the vision sensor module,
adjust a focal distance of the projector module based on the identified distance, and
control the projector module to project an image onto the identified region.

14. The electronic apparatus of claim 1, wherein a projector of the projector module comprises:
a light source;
a lens; and
a plurality of micro lenses,
wherein the plurality of micro lenses are disposed between the light source and the lens.

15. The electronic apparatus of claim 14, wherein:
the projector is configured to independently adjust at least one of a distance and angle of each of the plurality of micro lenses with respect to the lens, and
the plurality of micro lenses is disposed in a grid form.

* * * * *